US010156200B2

(12) United States Patent
Miyamoto

(10) Patent No.: US 10,156,200 B2
(45) Date of Patent: Dec. 18, 2018

(54) ABNORMALITY DIAGNOSIS SYSTEM OF DOWNSTREAM SIDE AIR-FUEL RATIO SENSOR

(71) Applicant: Toyota Jidosha Kabushiki Kaisha, Toyota-shi Aichi-ken (JP)

(72) Inventor: Hiroshi Miyamoto, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 285 days.

(21) Appl. No.: 15/222,372

(22) Filed: Jul. 28, 2016

(65) Prior Publication Data
US 2017/0030282 A1    Feb. 2, 2017

(30) Foreign Application Priority Data

Jul. 29, 2015    (JP) .................. 2015-149799

(51) Int. Cl.
*F02D 41/22*  (2006.01)
*F02D 41/14*  (2006.01)
*G01M 15/10*  (2006.01)

(52) U.S. Cl.
CPC ....... *F02D 41/222* (2013.01); *F02D 41/1441* (2013.01); *F02D 41/1454* (2013.01); *F02D 41/1495* (2013.01); *F02D 41/1474* (2013.01); *F02D 41/1475* (2013.01); *G01M 15/104* (2013.01); *Y02T 10/40* (2013.01)

(58) Field of Classification Search
CPC .................................................. F02D 41/222
USPC ......................................................... 73/1.06
See application file for complete search history.

(56) References Cited

U.S. PATENT DOCUMENTS

| 2004/0016419 | A1* | 1/2004 | Satou ................... F02D 11/105 |
| | | | 123/492 |
| 2005/0262828 | A1 | 12/2005 | Iihoshi et al. |
| 2007/0276580 | A1 | 11/2007 | Toda et al. |
| 2009/0229355 | A1 | 9/2009 | Shoda |
| 2015/0361844 | A1* | 12/2015 | Yoshida ................ F01N 3/0842 |
| | | | 60/285 |

(Continued)

FOREIGN PATENT DOCUMENTS

| JP | H05-256175 A | 10/1993 |
| JP | 2004-308574 A | 11/2004 |
| JP | 2005-337089 A | 12/2005 |

(Continued)

*Primary Examiner* — Walter L Lindsay, Jr.
*Assistant Examiner* — Philip Marcus T Fadul
(74) *Attorney, Agent, or Firm* — Dinsmore & Shohl LLP

(57) ABSTRACT

The abnormality diagnosis system comprises an air-fuel ratio control means which sets the target air-fuel ratio of exhaust gas to a first set air-fuel ratio set to a first side of a rich side or a lean side, then, when a downstream side output air-fuel ratio is at the first side, switches the target air-fuel ratio to a second set air-fuel ratio set to a second side at the opposite side from the first side. The abnormality diagnosis system calculates the time from when the target air-fuel ratio is switched to when the downstream side output air-fuel ratio starts to change toward the stoichiometric air-fuel ratio based on a differential value of the downstream side output air-fuel ratio and, when the calculated time is a predetermined time or more, judges that a dead time at the downstream side air-fuel ratio sensor is abnormal.

12 Claims, 15 Drawing Sheets

(56) References Cited

U.S. PATENT DOCUMENTS

2016/0273466 A1* 9/2016 Nakagawa .......... F02D 41/0235

FOREIGN PATENT DOCUMENTS

| JP | 2007-315210 A | 12/2007 |
| JP | 2009-221992 A | 10/2009 |
| JP | 2011-157938 A | 8/2011 |

* cited by examiner

FIG. 1
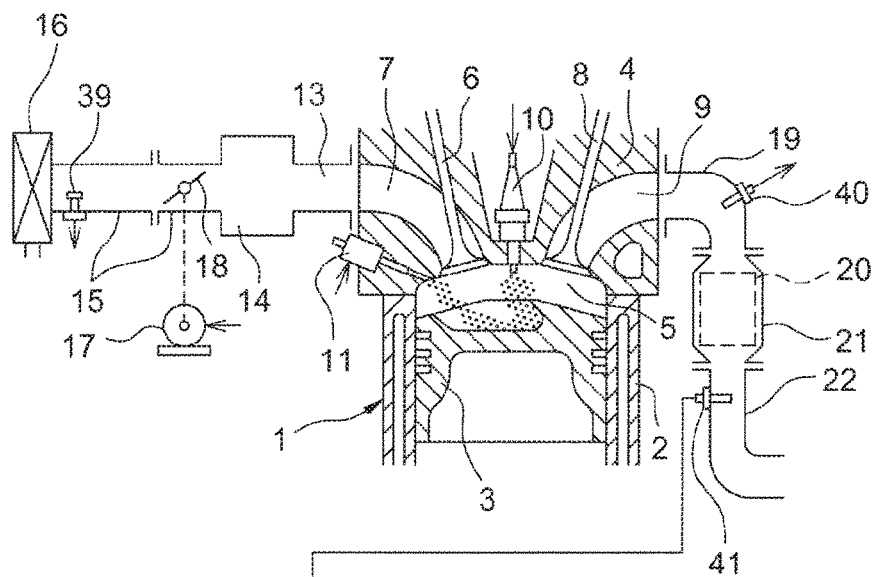
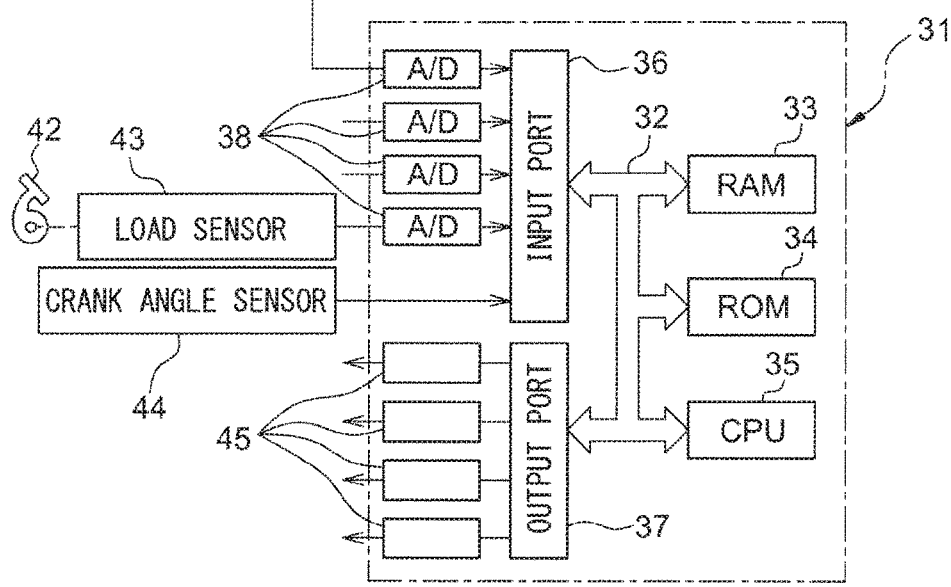

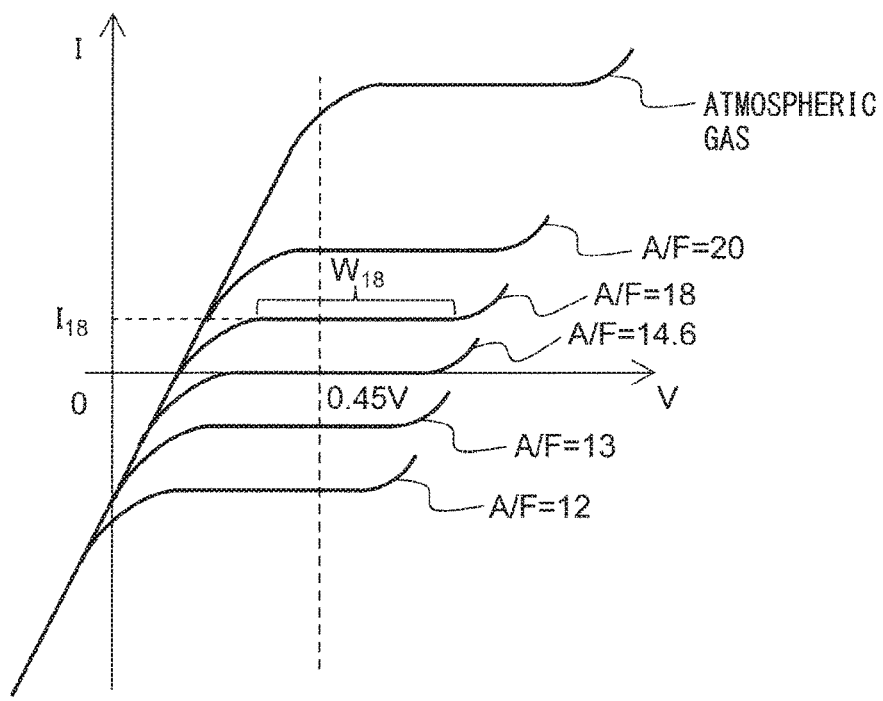
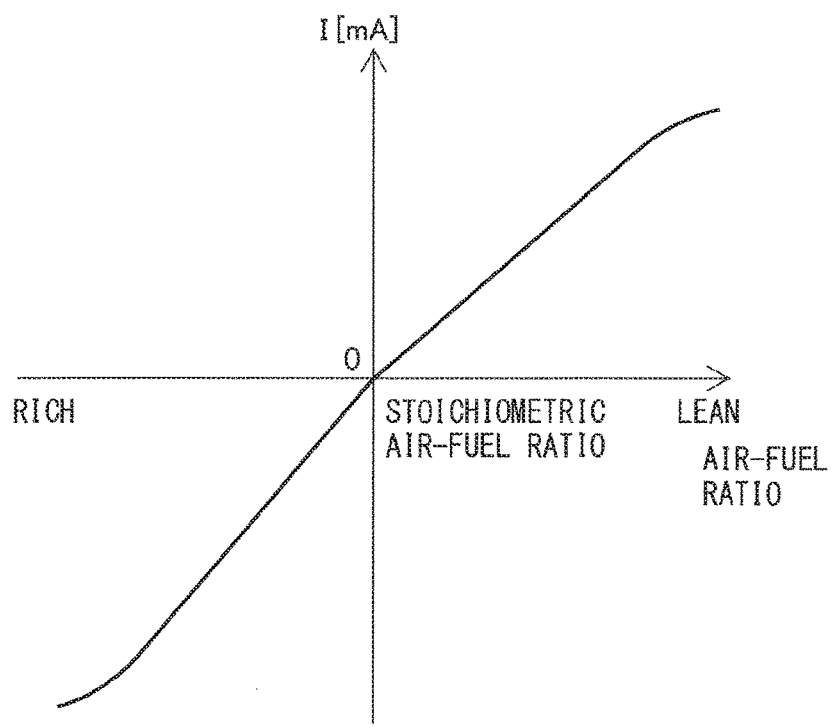

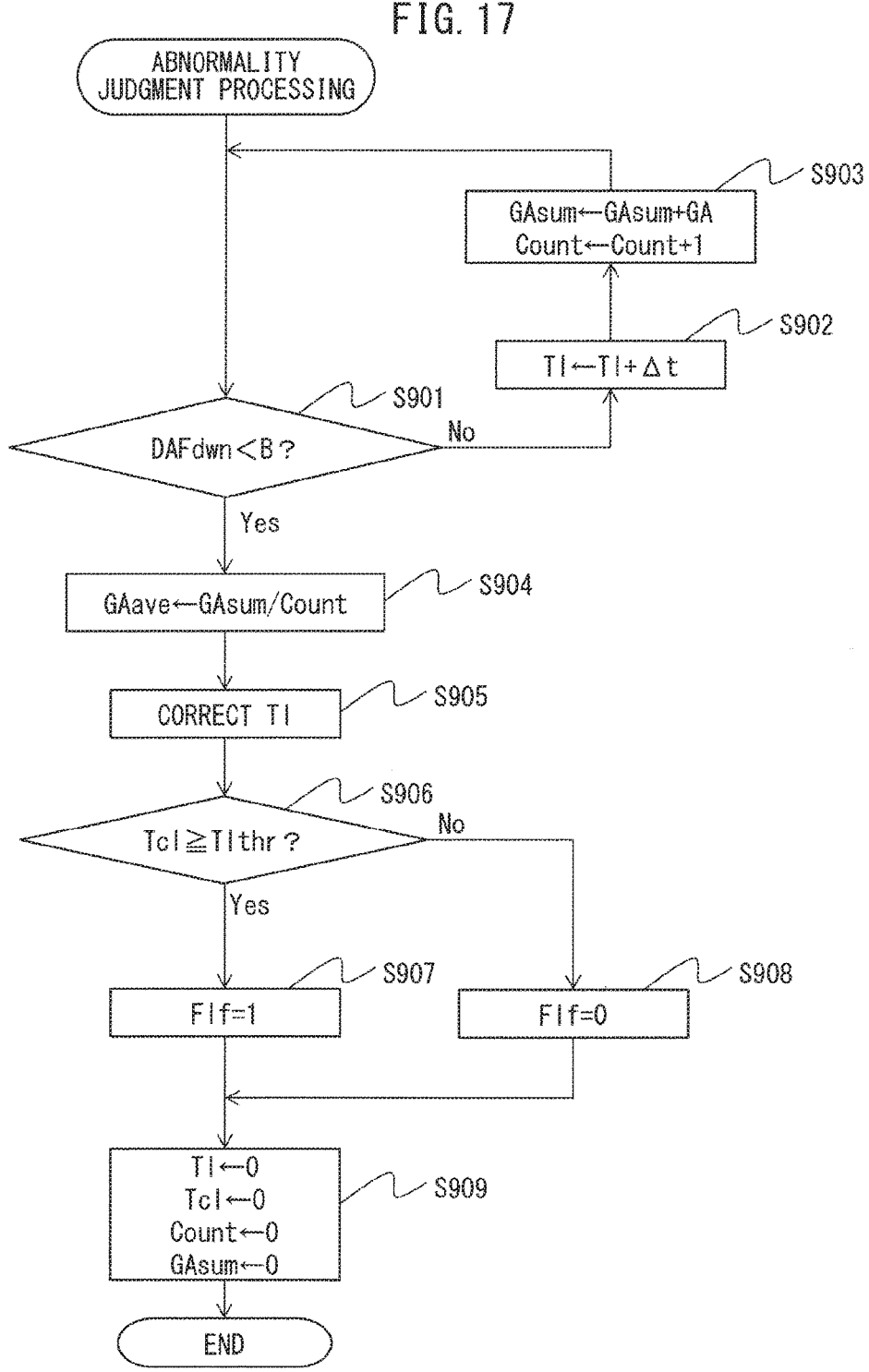

ABNORMALITY DIAGNOSIS SYSTEM OF DOWNSTREAM SIDE AIR-FUEL RATIO SENSOR

CROSS-REFERENCE TO RELATED APPLICATIONS

This application claims priority to Japanese Patent Application No. 2015-149799 filed on Jul. 29, 2015, the entire contents of which is hereby incorporated by reference.

TECHNICAL FIELD

The present disclosure relates to an abnormality diagnosis system of a downstream side air-fuel ratio sensor.

BACKGROUND ART

Known in the past has been an internal combustion engine which provides an air-fuel ratio sensor in an exhaust passage of the internal combustion engine and controls the amount of fuel fed to a combustion chamber of the internal combustion engine based on the output of this air-fuel ratio sensor.

As one example of an air-fuel ratio sensor, there is known an air-fuel ratio sensor which changes in output current linearly (proportionally) to an exhaust air-fuel ratio (for example, PLT 1). The output current becomes larger the higher the exhaust air-fuel ratio (the leaner it becomes). For this reason, by detecting the output current of the air-fuel ratio sensor, it is possible to estimate the exhaust air-fuel ratio.

However, an air-fuel ratio sensor has somewhat of a response delay. If the response delay of the downstream side air-fuel ratio sensor excessively increases, a change in the air-fuel ratio of the exhaust flowing out from the exhaust purification catalyst cannot be quickly detected, so the exhaust emission is liable to deteriorate. Therefore, PLTs 1 and 2 propose an abnormality diagnosis system for diagnosing abnormality of response delay of a downstream side air-fuel ratio sensor.

CITATION LIST

Patent Literature

PLT 1. Japanese Patent Publication No. 5-256175A
PLT 2. Japanese Patent Publication No. 2009-221992A

SUMMARY

Technical Problem

In this regard, as causes of the response delay of an air-fuel ratio sensor, the dead time and primary delay are known. The "dead time" corresponds to the time from when changing the amount of fuel fed to a combustion chamber to when the output of the air-fuel ratio sensor starts to change, while the "primary delay" corresponds to the time from when the output of the air-fuel ratio sensor starts to change to when it becomes an output corresponding to the actual exhaust air-fuel ratio. When diagnosing abnormality of the response delay of an air-fuel ratio sensor, the causes of the abnormality are preferably identified. Further, U.S. regulations demand that abnormality of the dead time of an upstream side air-fuel ratio sensor and abnormality of the primary delay be detected differentiated from each other.

In the abnormality diagnosis system described in PLT 1, if the time from when the target air-fuel ratio is switched between rich and lean to when the output of the downstream side air-fuel ratio sensor reaches a predetermined threshold value is a predetermined time or more, it is diagnosed that the response delay of the downstream side air-fuel ratio sensor is abnormal. However, the time from when the target air-fuel ratio is switched between rich and lean to when the output of the downstream side air-fuel ratio sensor reaches a predetermined threshold value changes according to both the dead time and primary delay. Therefore, in the abnormality diagnosis system described in PLT 1, abnormality of the dead time of the downstream side air-fuel ratio sensor and abnormality of the primary delay cannot be detected differentiated from each other.

Further, PLT 2 discloses measuring the time from the start of fuel cut to when the output of the downstream side air-fuel ratio sensor starts to change in the lean direction as the dead time. However, PLT 2 does not allude to the method of identification of the timing at which the output of the downstream side air-fuel ratio sensor changes in the lean direction.

Therefore, considering the above problems, the object of the present disclosure is to provide an abnormality diagnosis system of a downstream side air-fuel ratio sensor able to precisely detect abnormality of the dead time when the output air-fuel ratio of the downstream side air-fuel ratio sensor changes from a rich side or lean side from the stoichiometric air-fuel ratio to the stoichiometric air-fuel ratio.

Solution to Problem

In order to solve the above problem, in a first aspect of the present disclosure, there is provided an abnormality diagnosis system of a downstream side air-fuel ratio sensor provided in an exhaust passage of an internal combustion engine at a downstream side of an exhaust purification catalyst in a direction of exhaust flow, comprising an air-fuel ratio control means configured to set a target air-fuel ratio of exhaust gas flowing into the exhaust purification catalyst and control an amount of fuel fed to a combustion chamber so that an air-fuel ratio of the exhaust gas flowing into the exhaust purification catalyst matches the target air-fuel ratio, wherein the air-fuel ratio control means sets the target air-fuel ratio to a first set air-fuel ratio set to a first side of either side of a rich side and lean side from a stoichiometric air-fuel ratio, then, when a downstream side output air-fuel ratio detected by the downstream side air-fuel ratio sensor is at the first side from the stoichiometric air-fuel ratio, switches the target air-fuel ratio from the first set air-fuel ratio to a second set air-fuel ratio set to a second side at the opposite side from the first side from the stoichiometric air-fuel ratio, and the abnormality diagnosis system of a downstream side air-fuel ratio sensor is configured to calculate the time from when the target air-fuel ratio is switched from the first set air-fuel ratio to the second set air-fuel ratio to when the downstream side output air-fuel ratio starts to change toward the stoichiometric air-fuel ratio based on a differential value of the downstream side output air-fuel ratio and, when the calculated time is a predetermined time or more, to judge that a dead time at the downstream side air-fuel ratio sensor is abnormal.

In a second aspect of the present disclosure, the abnormality diagnosis system is configured to judge that the dead time in the downstream side air-fuel ratio sensor is not abnormal when the calculated time is less than the predetermined time, in the first aspect of the present disclosure.

In a third aspect of the present disclosure, the first side is a side richer than the stoichiometric air-fuel ratio, the second side is a side leaner than the stoichiometric air-fuel ratio, and the abnormality diagnosis system is configured to judge that the downstream side output air-fuel ratio has started to change toward the stoichiometric air-fuel ratio when the differential value of the downstream side output air-fuel ratio becomes larger than a predetermined value after the target air-fuel ratio is switched from the first set air-fuel ratio to the second set air-fuel ratio, in the first or second aspect of the present disclosure.

In a forth aspect of the present disclosure, the first side is a side leaner than the stoichiometric air-fuel ratio, the second side is a side richer than the stoichiometric air-fuel ratio, and the abnormality diagnosis system is configured to judge that the downstream side output air-fuel ratio has started to change toward the stoichiometric air-fuel ratio when the differential value of the downstream side output air-fuel ratio becomes smaller than a predetermined value after the target air-fuel ratio is switched from the first set air-fuel ratio to the second set air-fuel ratio, in the first or second aspect of the present disclosure.

In a fifth aspect of the present disclosure, the abnormality diagnosis system further comprises an upstream side air-fuel ratio sensor provided in the exhaust passage at an upstream side of the exhaust purification catalyst in the direction of exhaust flow, and the air-fuel ratio control means performs feedback control of the amount of fuel fed to the combustion chamber so that an upstream side output air-fuel ratio detected by the upstream side air-fuel ratio sensor matches the target air-fuel ratio, in any one of the first to fourth aspects of the present disclosure.

In a sixth aspect of the present disclosure, the abnormality diagnosis system further comprises an air flowmeter detecting an amount of intake air fed to the combustion chamber, and the abnormality diagnosis system is configured to correct the calculated time based on an intake air amount detected by the air flowmeter from when the target air-fuel ratio is switched from the first set air-fuel ratio to the second set air-fuel ratio to when the downstream side output air-fuel ratio starts to change toward the stoichiometric air-fuel ratio, judge that the dead time at the downstream side air-fuel ratio sensor is abnormal when the corrected time is the predetermined time or more, and judge that the dead time at the downstream side air-fuel ratio sensor is not abnormal when the corrected time is less than the predetermined time, in any one of the first to fifth aspects of the present disclosure.

In a seventh aspect of the present disclosure, the abnormality diagnosis system further comprises an air flowmeter detecting an amount of intake air fed to the combustion chamber, and the predetermined time is calculated based on an intake air amount detected by the air flowmeter from when the target air-fuel ratio is switched from the first set air-fuel ratio to the second set air-fuel ratio to when the downstream side output air-fuel ratio starts to change toward the stoichiometric air-fuel ratio, in any one of the first to fifth aspects of the present disclosure.

Advantageous Effects

According to the present disclosure, there is provided an abnormality diagnosis system of a downstream side air-fuel ratio sensor able to precisely diagnose abnormality of the dead time when the output air-fuel ratio of the downstream side air-fuel ratio sensor changes from the rich side or lean side to the stoichiometric air-fuel ratio.

BRIEF DESCRIPTION OF DRAWINGS

FIG. 1 is a view schematically showing an internal combustion engine in which an abnormality diagnosis system of a downstream side air-fuel ratio sensor according to an embodiment of the present disclosure is used.

FIG. 3 is a view showing a relationship of a sensor applied voltage and output current at different exhaust air-fuel ratios.

FIG. 4 is a view showing a relationship of an exhaust air-fuel ratio and output current when making a sensor applied voltage constant.

FIG. 17 is a flow chart showing a control routine of abnormality judgment processing.

DESCRIPTION OF EMBODIMENTS

Figure 2:
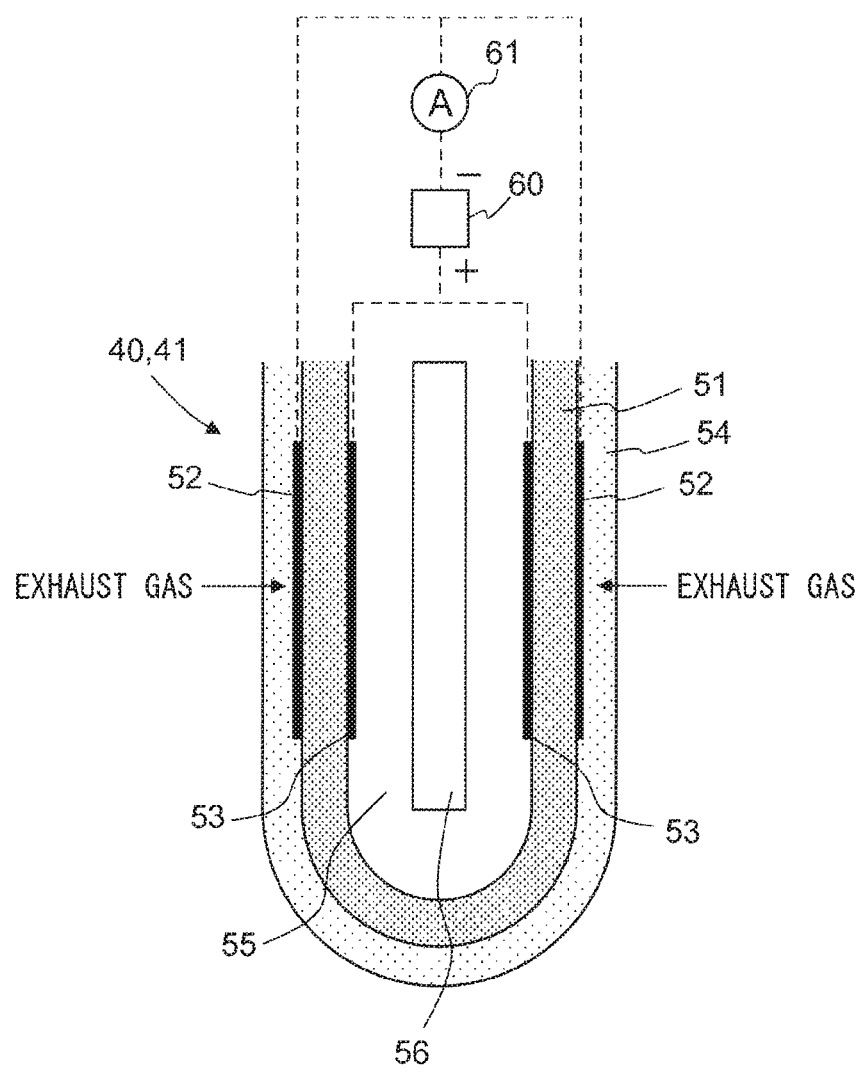
FIG. 2 is a view schematically showing a structure of an air-fuel ratio sensor.

Below, referring to the drawings, embodiments of the present disclosure will be explained in detail. Note that, in the following explanation, similar constituent elements are assigned the same reference notations.

First Embodiment

First, referring to FIG. 1 to FIG. 12, a first embodiment of the present disclosure will be explained.
<Explanation of Internal Combustion Engine as a Whole>
FIG. 1 is a view which schematically shows an internal combustion engine in which an abnormality diagnosis system of a downstream side air-fuel ratio sensor according to an embodiment of the present disclosure is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 directly injects a predetermined amount of fuel into the combustion chamber 5 in accordance with an injection signal. That is, the internal combustion engine of the present embodiment is a cylinder injection type internal combustion engine. Note that, the internal combustion engine may also be a port injection type internal combustion engine. In this case, the fuel injector 11 is arranged so as to inject fuel inside the intake port 7. Further, in the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to a combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runnres which are connected to the exhaust ports 9 and a header at which these runners are collected. The header of the exhaust manifold 19 is connected to a casing 21 which has an exhaust purification catalyst 20 built into it. The casing 21 is connected to an exhaust pipe 22. The exhaust port 9, exhaust manifold 19, casing 21, exhaust pipe 22, etc., form an exhaust passage which discharges exhaust gas produced due to combustion of the air-fuel mixture in the combustion chamber 5.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the exhaust purification catalyst 20). In addition, in the exhaust pipe 22, a downstream side air-fuel ratio sensor 41 is arranged which detects the air-fuel ratio of the exhaust gas flowing through the inside of the exhaust pipe 22 (that is, the exhaust gas which flows out from the exhaust purification catalyst 20). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as a control system for controlling the internal combustion engine.

The exhaust purification catalyst 20 is a three-way catalyst which has oxygen storage ability. Specifically, the exhaust purification catalyst 20 is comprised of carriers comprised of ceramic on which a precious metal having a catalytic action (for example, platinum (Pt)) and a substance having an oxygen storage ability (for example, ceria ($CeO_2$)) are carried. The exhaust purification catalyst 20 exhibits a catalytic action of simultaneously removing unburned gas (HC, CO, etc.) and nitrogen oxides ($NO_x$) when reaching a predetermined activation temperature and, in addition, an oxygen storage ability.

According to the oxygen storage ability of the exhaust purification catalyst 20, the exhaust purification catalyst 20 stores the oxygen in the exhaust gas when the air-fuel ratio of the exhaust gas flowing into the exhaust purification catalyst 20 is an air-fuel ratio leaner than the stoichiometric air-fuel ratio. On the other hand, the exhaust purification catalyst 20 releases the oxygen stored in the exhaust purification catalyst 20 when the inflowing exhaust gas has an air-fuel ratio richer than the stoichiometric air-fuel ratio. As a result, as long as the oxygen storage ability of the exhaust purification catalyst 20 is maintained, the air-fuel ratio of the exhaust gas flowing out from the exhaust purification catalyst 20 becomes substantially stoichiometric air-fuel ratio, regardless the air-fuel ratio of the exhaust gas flowing into the exhaust purification catalyst 20.

<Explanation of Air-Fuel Ratio Sensor>

In the present embodiment, as the air-fuel ratio sensors 40 and 41, cup type limit current type air-fuel ratio sensors are used. Referring to FIG. 2, the structures of the air-fuel ratio sensors 40 and 41 are simply explained. FIG. 2 is a view which schematically shows the structure of an air-fuel ratio sensor. Each of the air-fuel ratio sensors 40 and 41 is provided with a solid electrolyte layer 51, an exhaust side electrode 52 arranged on one side surface of the solid electrolyte layer 51, an atmosphere side electrode 53 arranged on the other side surface of the solid electrolyte layer 51, a diffusion regulation layer 54 regulating the diffusion of the flowing exhaust gas, a reference gas chamber 55, and a heater part 56 heating the air-fuel ratio sensor 40 or 41, in particular the electrolyte layer (element) 51.

In each of the cup type air-fuel ratio sensors 40 and 41 of the present embodiment, the solid electrolyte layer 51 is formed into a cylindrical shape with one closed end. Inside of the reference gas chamber 55 defined inside of the air-fuel ratio sensor 40 or 41, atmospheric gas (air) is introduced and the heater part 56 is arranged. On the inside surface of the solid electrolyte layer 51, an atmosphere side electrode 53 is arranged. On the outside surface of the solid electrolyte layer 51, an exhaust side electrode 52 is arranged. On the outside surfaces of the solid electrolyte layer 51 and the exhaust side electrode 52, a diffusion regulation layer 54 is arranged to cover the solid electrolyte layer 51 and the exhaust side electrode 52. Note that, at the outside of the diffusion regulation layer 54, a protective layer (not shown) may be provided for preventing a liquid etc. from depositing on the surface of the diffusion regulation layer 54.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor applied voltage V is supplied by the voltage control device 60 mounted on the ECU 31. In addition, the ECU 31 is provided with a current detection device 61 which detects the current flowing between these electrodes 52 and 53 through the solid electrolyte layer 51 when the sensor applied voltage is supplied. The current which is detected by this current detection device 61 is the output current of the air-fuel ratio sensors 40 and 41.

The thus configured air-fuel ratio sensors 40 and 41 have the voltage-current (V-I) characteristic such as shown in FIG. 3. FIG. 3 is a view which shows the relationship between sensor applied voltage and output current at different exhaust air-fuel ratios. As will be understood from FIG. 3, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor applied voltage changes. This voltage region is called the "limit current region". The current at this time is called the "limit current". In FIG. 3, the limit current region and limit current when the exhaust air-fuel ratio is 18 are shown by $W_{18}$ and $I_{18}$.

On the other hand, in the region where the sensor applied voltage is lower than the limit current region, the output current changes substantially proportionally to the sensor applied voltage. The slope at this time is determined by the DC element resistance of the solid electrolyte layer 51. Further, in the region where the sensor applied voltage is higher than the limit current region, the output current also increases along with the increase in the sensor applied voltage. In this region, breakdown of the moisture, which is contained in the exhaust gas, on the exhaust side electrode 52, etc. causes the output current to change according to change of the sensor applied voltage.

FIG. 4 is a view which shows the relationship between the exhaust air-fuel ratio and the output current I when making the supplied voltage constant at about 0.45V. As will be understood from FIG. 4, in the air-fuel ratio sensors 40 and 41, the output current I changes linearly (proportionally) with respect to the exhaust air-fuel ratio so that the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors of the structure shown in FIG. 2 are used. However, any type of air-fuel ratio sensor can be used as the air-fuel ratio sensors 40 and 41, as long as the output current linearly changes with respect to the exhaust air-fuel ratio. Therefore, as the air-fuel ratio sensors 40 and 41, for example, it is also possible to use a layered-type limit current type air-fuel ratio sensor or other structure of limit current type air-fuel ratio sensor or air-fuel ratio sensor not a limit current type or any other air-fuel ratio sensor. Further, the air-fuel ratio sensors 40 and 41 may be air-fuel ratio sensors having different construction from each other.

<Abnormality Diagnosis of Downstream Side Air-Fuel Ratio Sensor>

In this regard, the air-fuel ratio sensors 40, 41 have some levels of response delay. If the response delay of the downstream side air-fuel ratio sensor 41 excessively increases, the change of the air-fuel ratio of the exhaust flowing out from the exhaust purification catalyst 20 cannot be quickly detected, so the exhaust emission is liable to deteriorate.

As causes of response delay of the downstream side air-fuel ratio sensor 41, the dead time and primary delay are known. The "dead time" corresponds to the time from when changing the amount of fuel fed to the combustion chamber 5 to when the output of the downstream side air-fuel ratio sensor 41 starts to change, while the primary delay corresponds to the time from when the output of the downstream side air-fuel ratio sensor 41 starts to change to when it becomes an output corresponding to the actual exhaust air-fuel ratio. When diagnosing abnormality of the response delay of the air-fuel ratio sensor, it is desirable to identify the cause of the abnormality.

Therefore, the internal combustion engine of the present embodiment comprises an abnormality diagnosis system of the downstream side air-fuel ratio sensor 41 to diagnose abnormality of the dead time of the downstream side air-fuel ratio sensor 41. The abnormality diagnosis system of the present embodiment diagnoses abnormality of the dead time when the output air-fuel ratio of the downstream side air-fuel ratio sensor 41 changes from the rich side or lean side to the stoichiometric air-fuel ratio. Note that, in the present embodiment, the ECU 31 functions as an abnormality diagnosis system.

The abnormality diagnosis system of the present embodiment comprises an air-fuel ratio control means. The air-fuel ratio control means sets the target air-fuel ratio of the exhaust gas flowing into the exhaust purification catalyst 20 based on the engine operating state. The target air-fuel ratio is, for example, made the stoichiometric air-fuel ratio (14.6) to raise the purification efficiency of the exhaust purification catalyst 20. Note that, the target air-fuel ratio may be set based on the output air-fuel ratio of the downstream side air-fuel ratio sensor 41. For example, the target air-fuel ratio is made an air-fuel ratio leaner than the stoichiometric air-fuel ratio when the output air-fuel ratio of the downstream side air-fuel ratio sensor 41 becomes an air-fuel ratio richer than the stoichiometric air-fuel ratio while is made an air-fuel ratio richer than the stoichiometric air-fuel ratio when the output air-fuel ratio of the downstream side air-fuel ratio sensor 41 becomes an air-fuel ratio leaner than the stoichiometric air-fuel ratio. Note that, the output air-fuel ratio means an air-fuel ratio corresponding to the output value of the air-fuel ratio sensor.

Further, the air-fuel ratio control means controls the amount of fuel fed to the combustion chamber 5 so that the air-fuel ratio of the exhaust gas flowing into the exhaust purification catalyst 20 matches the target air-fuel ratio. Specifically, the air-fuel ratio control means performs feedback control of the amount of fuel fed to the combustion chamber 5 so that the output air-fuel ratio of the upstream side air-fuel ratio sensor 40 matches the target air-fuel ratio. Note that, the amount of fuel fed to the combustion chamber 5 may also be controlled without using the upstream side air-fuel ratio sensor 40. In this case, the amount of fuel calculated from the intake air amount detected by the air flowmeter 39 and the target air-fuel ratio is fed to the combustion chamber 5 so that the ratio of the fuel and air fed into the combustion chamber 5 matches the target air-fuel ratio.

In the present embodiment, when diagnosing abnormality of the dead time, the air-fuel ratio control means alternately switches the target air-fuel ratio between a rich set air-fuel ratio richer than the stoichiometric air-fuel ratio and a lean set air-fuel ratio leaner than the stoichiometric air-fuel ratio. The rich set air-fuel ratio is a predetermined air-fuel ratio, for example, is made 14.1. The lean set air-fuel ratio is a predetermined air-fuel ratio, for example, is made 16.1.

Specifically, the air-fuel ratio control means sets the target air-fuel ratio to the rich set air-fuel ratio, then switches the target air-fuel ratio from the rich set air-fuel ratio to the lean set air-fuel ratio when the air-fuel ratio detected by the downstream side air-fuel ratio sensor 41 reaches a rich judged air-fuel ratio richer than the stoichiometric air-fuel ratio. Further, the air-fuel ratio control means sets the target air-fuel ratio to the lean set air-fuel ratio, then switches the target air-fuel ratio from the lean set air-fuel ratio to the rich set air-fuel ratio when the air-fuel ratio detected by the downstream side air-fuel ratio sensor 41 reaches a lean judged air-fuel ratio leaner than the stoichiometric air-fuel ratio. The rich judged air-fuel ratio is made a predetermined air-fuel ratio, for example, is made 14.55. After the target air-fuel ratio is set to the rich set air-fuel ratio, if the output air-fuel ratio of the downstream side air-fuel ratio sensor 41 reaches the rich judged air-fuel ratio, it is judged that exhaust gas richer than the stoichiometric air-fuel ratio has reached the downstream side air-fuel ratio sensor 41. Further, the lean judged air-fuel ratio is made a predetermined air-fuel ratio, for example, is made 14.65. After the target air-fuel ratio is set to the lean set air-fuel ratio, if the output air-fuel ratio of the downstream side air-fuel ratio sensor 41 reaches the lean judged air-fuel ratio, it is judged that an exhaust gas leaner than the stoichiometric air-fuel ratio has reached the downstream side air-fuel ratio sensor 41.

The abnormality diagnosis system calculates the time from when the target air-fuel ratio is switched from the rich set air-fuel ratio to the lean set air-fuel ratio to when the output air-fuel ratio of the downstream side air-fuel ratio sensor 41 starts to change toward the stoichiometric air-fuel ratio based on the differential value of the output air-fuel ratio of the downstream side air-fuel ratio sensor 41. If the calculated time is a predetermined time or more, the abnormality diagnosis system judges that the dead time at the downstream side air-fuel ratio sensor 41 is abnormal. If the calculated time is less than a predetermined time, the abnormality diagnosis system judges that the dead time at the downstream side air-fuel ratio sensor 41 is not abnormal, that is, that the dead time at the downstream side air-fuel ratio sensor 41 is normal. Specifically, the abnormality diagnosis system judges that the output air-fuel ratio of the downstream side air-fuel ratio sensor 41 has started to change toward the stoichiometric air-fuel ratio when the differential value of the output air-fuel ratio of the downstream side air-fuel ratio sensor 41 becomes larger than the predetermined value after the target air-fuel ratio is switched from the rich set air-fuel ratio to the lean set air-fuel ratio.

Further, the abnormality diagnosis system calculates the time from when the target air-fuel ratio is switched from the lean set air-fuel ratio to the rich set air-fuel ratio to when the output air-fuel ratio of the downstream side air-fuel ratio sensor 41 starts to change toward the stoichiometric air-fuel ratio based on the differential value of the output air-fuel ratio of the downstream side air-fuel ratio sensor 41. If the calculated time is a predetermined time or more, the abnormality diagnosis system judges that the dead time at the downstream side air-fuel ratio sensor 41 is abnormal. If the calculated time is less than the predetermined time, the abnormality diagnosis system judges that the dead time at the downstream side air-fuel ratio sensor 41 is not abnormal, that is, that the dead time at the downstream side air-fuel ratio sensor 41 is normal. Specifically, the abnormality diagnosis system judges that the output air-fuel ratio of the downstream side air-fuel ratio sensor 41 has started to change toward the stoichiometric air-fuel ratio when the differential value of the output air-fuel ratio of the downstream side air-fuel ratio sensor 41 becomes smaller than the predetermined value after the target air-fuel ratio is switched from the lean set air-fuel ratio to the rich set air-fuel ratio.

Below, referring to FIG. 5 to FIG. 12, this abnormality diagnosis will be specifically explained.

<Time Chart of Abnormality Diagnosis>

Figure 5:
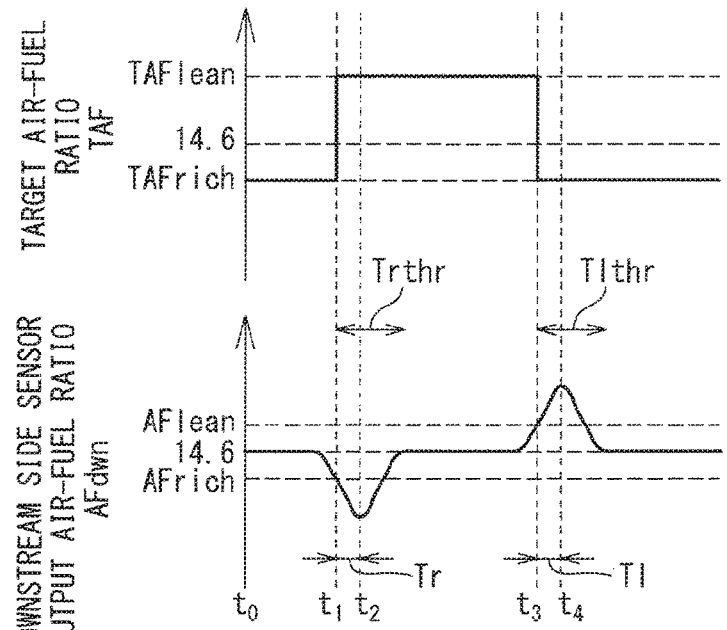
FIG. 5 is a time chart of a target air-fuel ratio and output air-fuel ratio of a downstream side air-fuel ratio sensor in the case where a dead time at the downstream side air-fuel ratio sensor is not abnormal.
Figure 6:
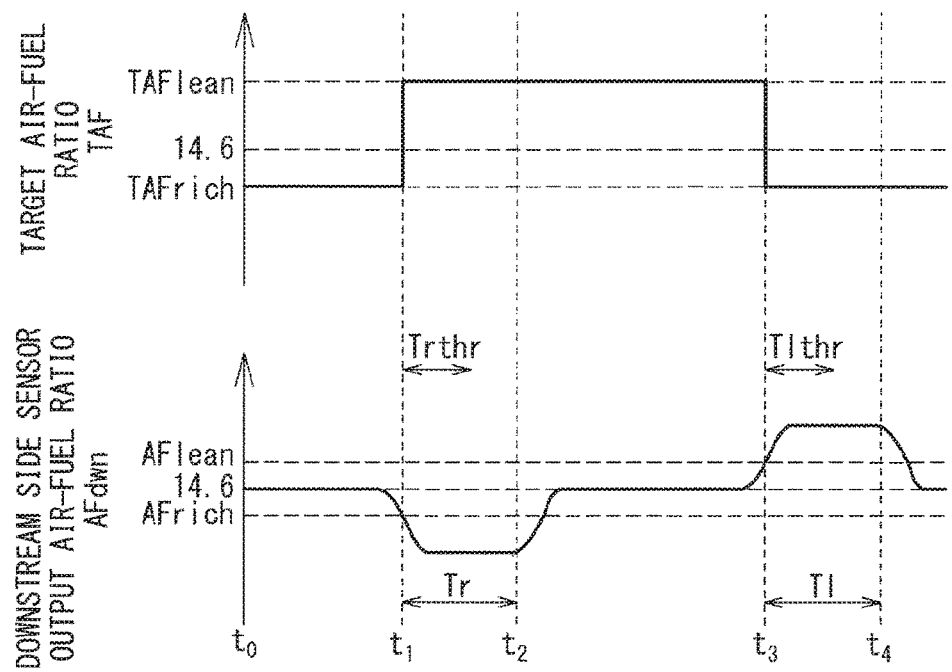
FIG. 6 is a time chart of a target air-fuel ratio and output air-fuel ratio of a downstream side air-fuel ratio sensor in the case where a dead time at the downstream side air-fuel ratio sensor is abnormal.

FIG. 5 is a time chart of the target air-fuel ratio TAF and the output air-fuel ratio AFdwn of the downstream side air-fuel ratio sensor 41 if the dead time at the downstream side air-fuel ratio sensor 41 is not abnormal. FIG. 6 is a time chart of the target air-fuel ratio TAF and the output air-fuel ratio AFdwn of the downstream side air-fuel ratio sensor 41 if the dead time at the downstream side air-fuel ratio sensor 41 is abnormal. In the example of FIG. 5 and FIG. 6, similar air-fuel ratio control is performed.

In the example of FIG. 5 and FIG. 6, before the time $t_1$, the target air-fuel ratio TAF is set to the rich set air-fuel ratio TAFrich. At the time $t_0$, the exhaust purification catalyst 20 stores oxygen, so exhaust gas richer than the stoichiometric air-fuel ratio is purified at the exhaust purification catalyst 20, and the output air-fuel ratio AFdwn of the downstream side air-fuel ratio sensor 41 (below, also referred to as the "downstream side output air-fuel ratio AFdwn") becomes the stoichiometric air-fuel ratio. After that, when the oxygen storage amount of the exhaust purification catalyst 20 approaches zero, exhaust gas richer than the stoichiometric air-fuel ratio starts to flow out from the exhaust purification catalyst 20. As a result, at the time $t_1$, the downstream side output air-fuel ratio AFdwn reaches the rich judged air-fuel ratio AFrich. At this time, it is judged that exhaust gas richer than the stoichiometric air-fuel ratio has reached the downstream side air-fuel ratio sensor 41.

At the time $t_1$, if the downstream side output air-fuel ratio AFdwn becomes the rich judged air-fuel ratio AFrich or less, the target air-fuel ratio TAF is switched from the rich set air-fuel ratio TAFrich to the lean set air-fuel ratio TAFlean. As a result, the oxygen storage amount of the exhaust purification catalyst 20 increases, and the downstream side output air-fuel ratio AFdwn changes toward the stoichiometric air-fuel ratio.

In the present embodiment, the time when the downstream side output air-fuel ratio AFdwn starts to change toward the stoichiometric air-fuel ratio (time $t_2$ in FIG. 5 and FIG. 6) is identified based on the differential value of the downstream side output air-fuel ratio AFdwn. Specifically, the time when the differential value of the downstream side output air-fuel ratio AFdwn becomes larger than a predetermined value is made the time when the downstream side output air-fuel ratio AFdwn starts to change toward the stoichiometric air-fuel ratio. Note that, the "differential value of the downstream side output air-fuel ratio AFdwn" means the slope of the change of time of the downstream side output air-fuel ratio AFdwn.

The predetermined value is made a value enabling the time when the downstream side output air-fuel ratio AFdwn starts to change toward the stoichiometric air-fuel ratio to be identified differentiated from noise of the output signal and is made zero or a value slightly larger than zero. In the example of FIG. 5 and FIG. 6, the predetermined value is made zero. Further, if the differential value of the downstream side output air-fuel ratio AFdwn is detected at predetermined time intervals, the time when the differential value of the downstream side output air-fuel ratio AFdwn becomes larger than the predetermined value a plurality of times in succession may be made the time when the downstream side output air-fuel ratio AFdwn starts to change toward the stoichiometric air-fuel ratio.

In the present embodiment, the time from when the target air-fuel ratio TAF is switched from the rich set air-fuel ratio TAFrich to the lean set air-fuel ratio TAFlean to when the downstream side output air-fuel ratio AFdwn starts to change toward the stoichiometric air-fuel ratio is calculated as the rich side dead time Tr. In the example of FIG. 5, the rich side dead time Tr is less than the predetermined rich side threshold value time Trthr, so it is judged that the dead time at the downstream side air-fuel ratio sensor 41 is not abnormal, that is, that the dead time at the downstream side air-fuel ratio sensor 41 is normal. On the other hand, in the example of FIG. 6, the rich side dead time Tr is the predetermined rich side threshold value time Trthr or more, so it is judged that the dead time at the downstream side air-fuel ratio sensor 41 is abnormal.

After the downstream side output air-fuel ratio AFdwn reaches the stoichiometric air-fuel ratio, the oxygen storage amount of the exhaust purification catalyst 20 further increases. When it approaches the maximum storage amount, an exhaust gas leaner than the stoichiometric air-fuel ratio starts to flow out from the exhaust purification catalyst 20. As a result, at the time $t_3$, the output air-fuel ratio AFdwn of the downstream side air-fuel ratio sensor 41 reaches the lean judged air-fuel ratio AFlean. At this time, it is judged that an exhaust gas leaner than the stoichiometric air-fuel ratio has reached the downstream side air-fuel ratio sensor 41.

At the time $t_3$, if the output air-fuel ratio AFdwn of the downstream side air-fuel ratio sensor 41 becomes the lean judged air-fuel ratio AFlean or more, the target air-fuel ratio TAF is switched from the lean set air-fuel ratio TAFlean to the rich set air-fuel ratio TAFrich. As a result, the oxygen storage amount of the exhaust purification catalyst 20 decreases and the downstream side output air-fuel ratio AFdwn changes toward the stoichiometric air-fuel ratio.

In the present embodiment, the time when the downstream side output air-fuel ratio AFdwn starts to change toward the stoichiometric air-fuel ratio (the time $t_4$ in FIG. 5 and FIG. 6) is identified based on the differential value of the downstream side output air-fuel ratio AFdwn. Specifically, the time when the differential value of the downstream side output air-fuel ratio AFdwn becomes smaller than the predetermined value is made the time when the output air-fuel ratio AFdwn of the downstream side air-fuel ratio sensor 41 starts to change toward the stoichiometric air-fuel ratio.

The predetermined value is made a value enabling the time when the downstream side output air-fuel ratio AFdwn starts to change toward the stoichiometric air-fuel ratio to be identified differentiated from noise of the output signal and is made zero or a value slightly smaller than zero. In the example of FIG. 5 and FIG. 6, the predetermined value is made zero. Further, if the differential value of the downstream side output air-fuel ratio AFdwn is detected at predetermined time intervals, the time when the differential value of the downstream side output air-fuel ratio AFdwn becomes smaller than a predetermined value a plurality of times in succession may be made the time when the downstream side output air-fuel ratio AFdwn starts to change toward the stoichiometric air-fuel ratio.

In the present embodiment, the time from when the target air-fuel ratio TAF is switched from the lean set air-fuel ratio TAFlean to the rich set air-fuel ratio TAFrich to when the downstream side output air-fuel ratio AFdwn starts to change toward the stoichiometric air-fuel ratio is calculated as the lean side dead time Tl. In the example of FIG. 5, the lean side dead time Tl is less than a predetermined lean side threshold value time Tlthr, so it is judged that the dead time at the downstream side air-fuel ratio sensor 41 is not abnormal, that is, that the dead time at the downstream side air-fuel ratio sensor 41 is normal. On the other hand, in the example of FIG. 6, the lean side dead time Tl is the predetermined lean side threshold value time Tlthr or more, so it is judged that the dead time at the downstream side air-fuel ratio sensor 41 is abnormal. Note that, in the present embodiment, the lean side threshold value time Tlthr is made a time the same as the rich side threshold value time Trthr, but it may also be a time different from the rich side threshold value time Trthr.

<Effect in Abnormality Diagnosis of Present Embodiment>

In this regard, the time from when the target air-fuel ratio TAF is switched to when the downstream side output air-fuel ratio AFdwn reaches a predetermined value (for example rich judged air-fuel ratio AFrich or lean judged air-fuel ratio AFlean) is affected by the primary delay of the downstream side air-fuel ratio sensor 41. On the other hand, the time from when the target air-fuel ratio TAF is switched to when the downstream side output air-fuel ratio AFdwn starts to change toward the stoichiometric air-fuel ratio is not affected much at all by the primary delay of the downstream side air-fuel ratio sensor 41. In the present embodiment, as explained above, the time from when the target air-fuel ratio TAF is switched to when the downstream side output air-fuel ratio AFdwn starts to change toward the stoichiometric air-fuel ratio is calculated as a dead time. Due to this, the abnormality of the dead time of the downstream side air-fuel ratio sensor 41 can be detected differentiated from abnormality of the primary delay.

Further, if the rich side dead time Tr of the downstream side air-fuel ratio sensor 41 is calculated in the state where the oxygen storage amount of the exhaust purification catalyst 20 is not zero, the rich side dead time Tr is affected by the oxygen storage amount of the exhaust purification catalyst 20. On the other hand, in the present embodiment, the rich side dead time Tr of the downstream side air-fuel ratio sensor 41 is calculated in the state where the oxygen storage amount of the exhaust purification catalyst 20 is zero, so the rich side dead time Tr is not affected by the oxygen storage amount of the exhaust purification catalyst 20. For this reason, in the present embodiment, it is possible to precisely diagnose abnormality of the dead time when the downstream side output air-fuel ratio AFdwn changes from a side richer than the stoichiometric air-fuel ratio to the stoichiometric air-fuel ratio.

Further, if the lean side dead time Tl of the downstream side air-fuel ratio sensor 41 is calculated in the state where the oxygen storage amount of the exhaust purification catalyst 20 is not the maximum, the lean side dead time Tl is affected by the oxygen storage amount of the exhaust purification catalyst 20. On the other hand, in the present embodiment, the lean side dead time Tl of the downstream side air-fuel ratio sensor 41 is calculated in the state where the oxygen storage amount of the exhaust purification catalyst 20 is the maximum, so the lean side dead time Tl is not affected by the oxygen storage amount of the exhaust purification catalyst 20. For this reason, in the present embodiment, it is possible to precisely diagnose abnormality of the dead time when the downstream side output air-fuel ratio AFdwn changes from a side leaner than the stoichiometric air-fuel ratio to the stoichiometric air-fuel ratio.

<Control Routine of Rich Side Abnormality Diagnosis>

Figure 7:
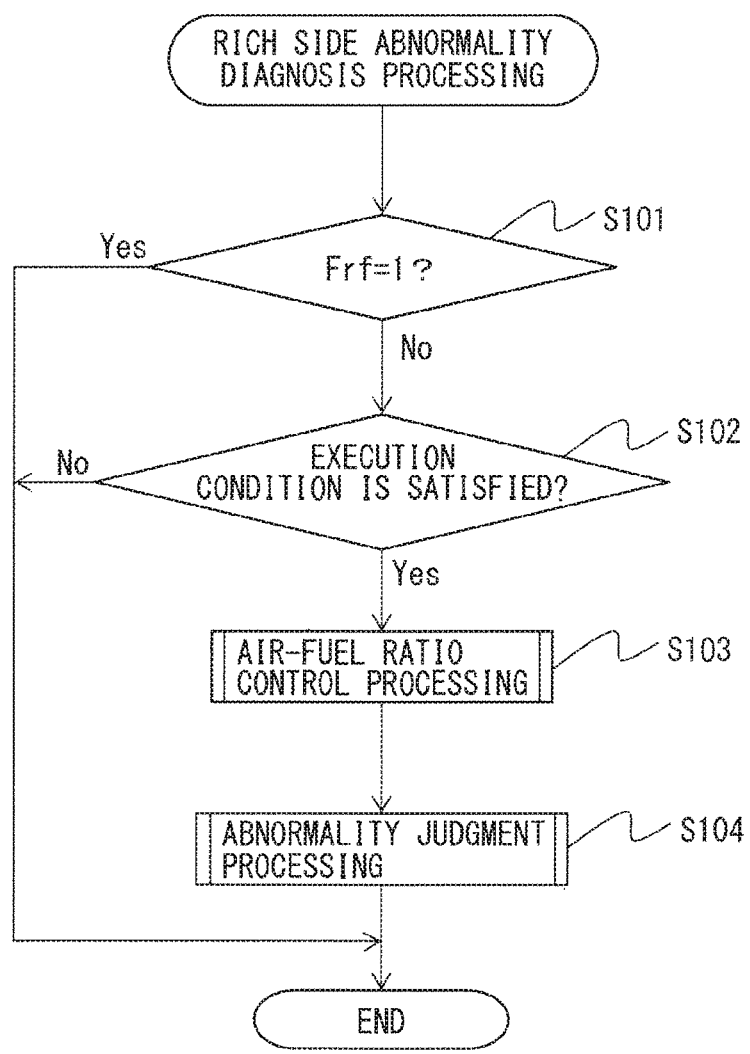
FIG. 7 is a flow chart showing a control routine of rich side abnormality diagnosis processing of a downstream side air-fuel ratio sensor.

Below, referring to the flow chart of FIG. 7, rich side abnormality diagnosis of the downstream side air-fuel ratio sensor 41 will be explained in detail. FIG. 7 is a flow chart showing the control routine of the rich side abnormality diagnosis processing of the downstream side air-fuel ratio sensor 41. In the illustrated control routine, abnormality of the dead time when the output air-fuel ratio AFdwn of the downstream side air-fuel ratio sensor 41 changes from a side richer than the stoichiometric air-fuel ratio to the stoichiometric air-fuel ratio is diagnosed.

The illustrated control routine is performed, for example, every time the internal combustion engine is started at a predetermined timing after the start of the internal combustion engine. First, at step S101, it is judged if the rich side abnormality judgment flag Frf is "1". The rich side abnormality judgment flag Frf is a flag which is made "1" when it is judged that the rich side dead time at the downstream side air-fuel ratio sensor 41 is abnormal in the later explained abnormality judgment processing. Note that, the initial value of the rich side abnormality judgment flag Frf is set to zero. If, at step S101, it is judged that the rich side abnormality judgment flag Frf is "1", there is no need to perform the abnormality diagnosis, so the control routine is ended. On the other hand, if, at step S101, it is judged that the rich side abnormality judgment flag Frf is zero, the routine proceeds to step S102.

At step S102, it is judged if a condition for performing the abnormality diagnosis processing is satisfied. The dead time of the downstream side air-fuel ratio sensor 41 sometimes fluctuates due to atmospheric pressure, the temperature of the sensor element, etc. For this reason, at step S102, to raise the precision of the abnormality diagnosis, it is judged if, for example, the atmospheric pressure and temperature of the sensor element are within predetermined ranges. If the atmospheric pressure and the temperature of the sensor element are within predetermined ranges, it is judged that the condition for performing the abnormality diagnosis processing is satisfied. Further, the abnormality diagnosis may be performed just one time for each startup of the internal combustion engine, so, at step S102, it may be judged if abnormality diagnosis has already been performed after startup of the internal combustion engine. If abnormality diagnosis has already been performed after startup of the internal combustion engine, it is judged that the condition for performing abnormality diagnosis processing is not satisfied. If, at step S102, it is judged that the condition for performing the abnormality diagnosis processing is not satisfied, the control routine is ended. On the other hand, if, at step S102, the condition for performing the abnormality diagnosis processing is satisfied, the routine proceeds to step S103.

At step S103, the later explained air-fuel ratio control processing is performed. Next, at step S104, the later explained abnormality judgment processing is performed. After step S104, the control routine is ended.

<Control Routine of Air-Fuel Ratio Control Processing>

Figure 8:
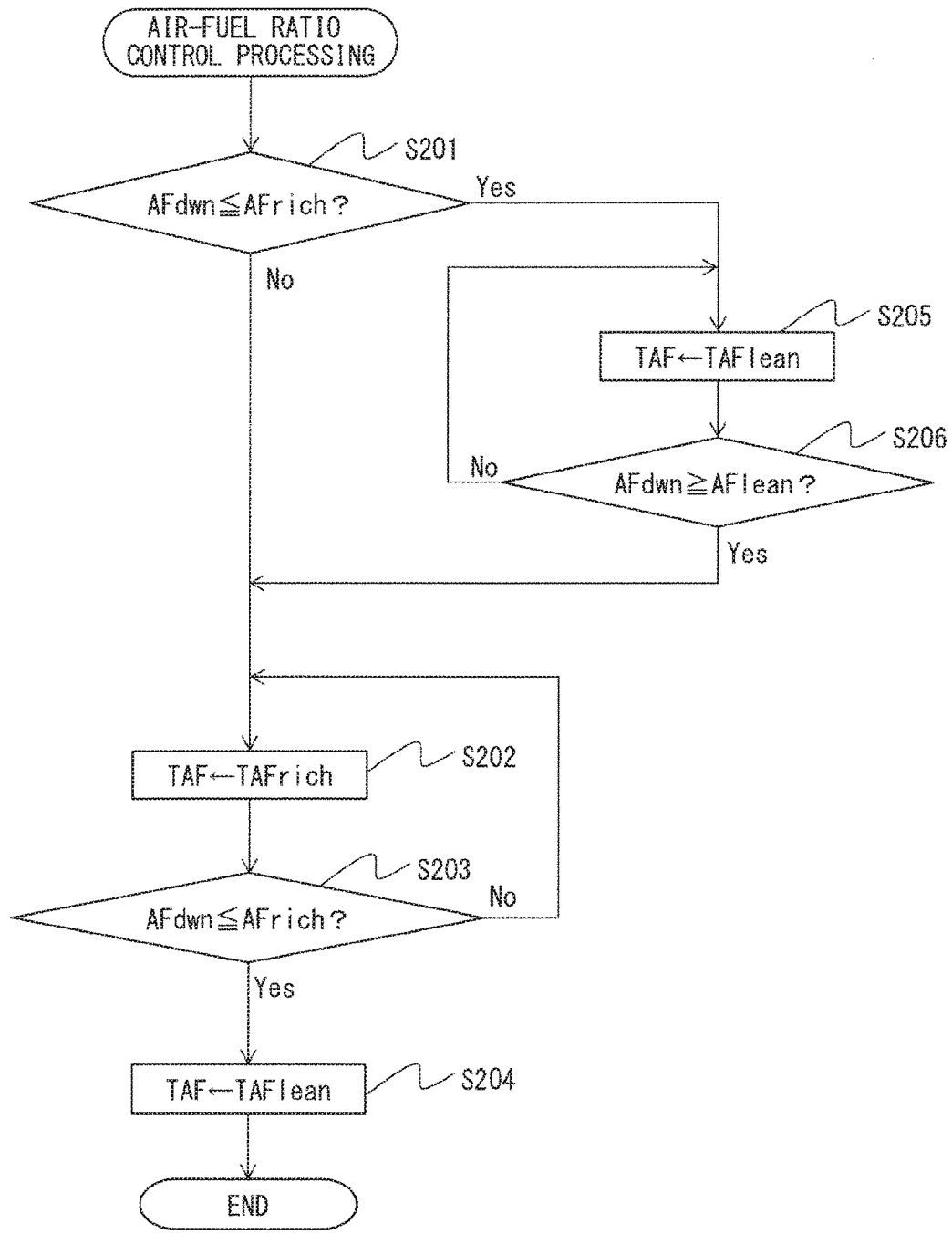
FIG. 8 is a flow chart showing a control routine of air-fuel ratio control processing.

In the air-fuel ratio control processing at step S103 of FIG. 7, first, the target air-fuel ratio TAF is set to the lean set air-fuel ratio TAFlean or rich set air-fuel ratio TAFrich based on the current downstream side output air-fuel ratio AFdwn. After that, the target air-fuel ratio TAF is switched between the lean set air-fuel ratio TAFlean and the rich set air-fuel ratio TAFrich so as to calculate the rich side dead time Tr. Below, referring to the flow chart of FIG. 8, this air-fuel ratio control processing will be explained in detail. FIG. 8 is a flow chart showing the control routine of air-fuel ratio control processing.

First, at step S201, it is judged if the downstream side output air-fuel ratio AFdwn is the rich judged air-fuel ratio AFrich or less. If it is judged that the downstream side output air-fuel ratio AFdwn is larger than the rich judged air-fuel ratio AFrich, the routine proceeds to step S202.

At step S202, the target air-fuel ratio TAF is set to the rich set air-fuel ratio TAFrich. Next, at step S203, it is judged if the downstream side output air-fuel ratio AFdwn is the rich judged air-fuel ratio AFrich or less. If it is judged that the downstream side output air-fuel ratio AFdwn is larger than the rich judged air-fuel ratio AFrich, the routine returns to step S202. On the other hand, if it is judged that the downstream side output air-fuel ratio AFdwn is the rich judged air-fuel ratio AFrich or less, the routine proceeds to step S204. Therefore, the target air-fuel ratio TAF is maintained at the rich set air-fuel ratio TAFrich until the downstream side output air-fuel ratio AFdwn becomes the rich judged air-fuel ratio AFrich or less.

At step S204, the target air-fuel ratio TAF is switched from the rich set air-fuel ratio TAFrich to the lean set air-fuel ratio TAFlean. After step S204, the control routine is ended.

On the other hand, if, at step S201, it is judged that the downstream side output air-fuel ratio AFdwn is the rich judged air-fuel ratio AFrich or less, the routine proceeds to step S205. At step S205, the target air-fuel ratio TAF is set to the lean set air-fuel ratio TAFlean.

Next, at step S206, it is judged if the downstream side output air-fuel ratio AFdwn is the lean judged air-fuel ratio AFlean or more. If it is judged that the downstream side output air-fuel ratio AFdwn is smaller than the lean judged air-fuel ratio AFlean, the routine returns to step S205. On the other hand, if it is judged that the downstream side output air-fuel ratio AFdwn is the lean judged air-fuel ratio AFlean or more, the routine proceeds to step S202. Therefore, the target air-fuel ratio TAF is maintained at the lean set air-fuel ratio TAFlean until the downstream side output air-fuel ratio AFdwn becomes the lean judged air-fuel ratio AFlean or more.

At step S202, the target air-fuel ratio TAF is switched from the lean set air-fuel ratio TAFlean to the rich set air-fuel ratio TAFrich. After step S202, the above-mentioned step S203 and step S204 are performed.

<Control Routine of Abnormality Judgment Processing>

Figure 9:
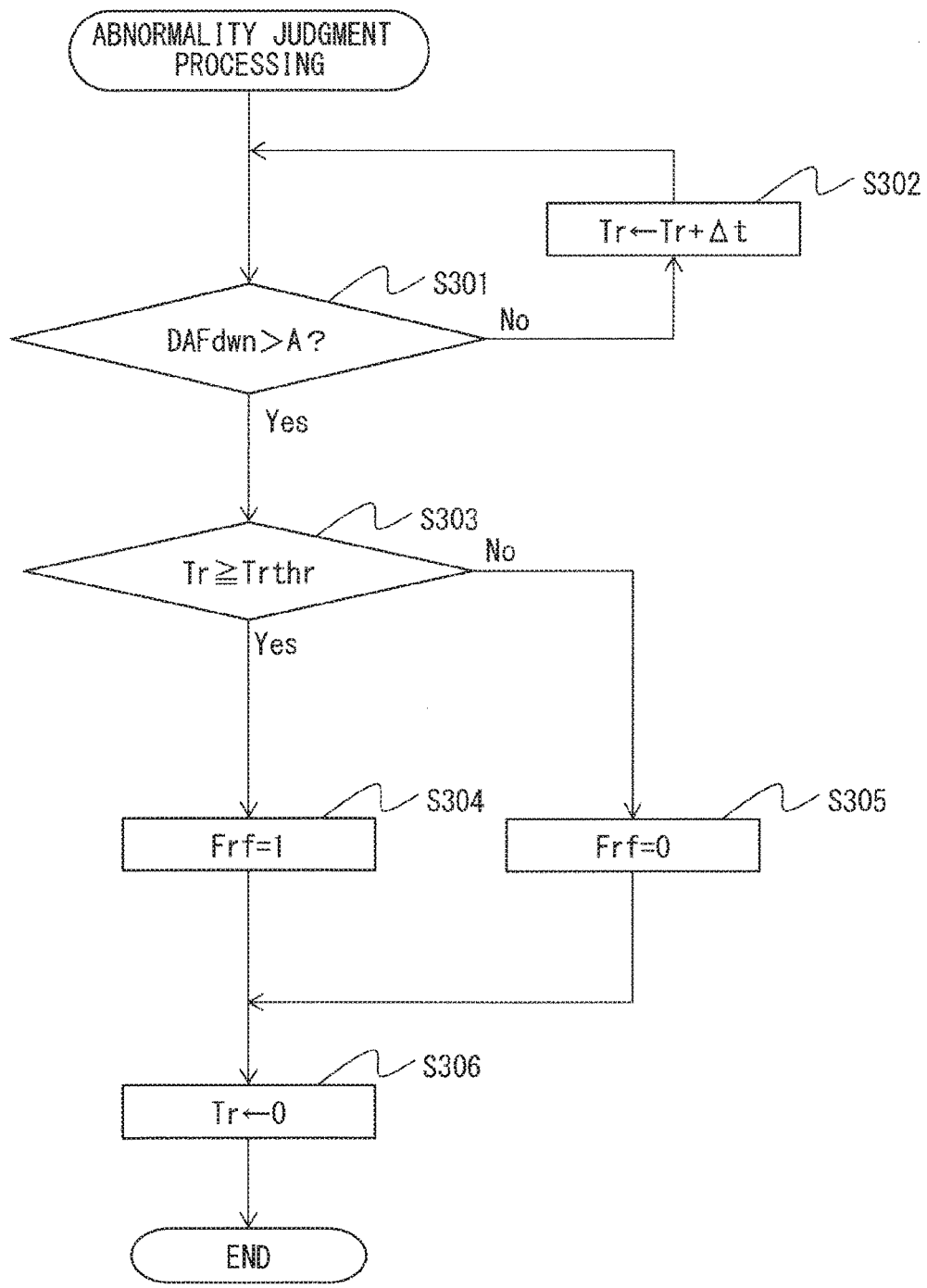
FIG. 9 is a flow chart showing a control routine of abnormality judgment processing.

In the abnormality judgment processing at step S104 of FIG. 7, the rich side dead time Tr is calculated and it is judged if the dead time at the downstream side air-fuel ratio sensor 41 is abnormal. Below, referring to the flow chart of FIG. 9, this abnormality judgment processing will be explained in detail. FIG. 9 is a flow chart showing the control routine of abnormality judgment processing.

First, at step S301, it is judged if the differential value DAFdwn of the downstream side output air-fuel ratio AFdwn is larger than the predetermined value A. The predetermined value A is zero or a value slightly bigger than zero. This judgment is performed for judging if the downstream side output air-fuel ratio AFdwn has started to change toward the stoichiometric air-fuel ratio. If it is judged that the differential value DAFdwn of the downstream side output air-fuel ratio AFdwn is the predetermined value A or less, it is judged that the downstream side output air-fuel ratio AFdwn has not started to change toward the stoichiometric air-fuel ratio and the routine proceeds to step S302.

At step S302, the rich side dead time Tr plus the fine time Δt is made the new rich side dead time Tr. At step S301, if it is judged that the differential value DAFdwn of the downstream side output air-fuel ratio AFdwn is larger than the predetermined value A, it is judged that the downstream side output air-fuel ratio AFdwn has started to change toward the stoichiometric air-fuel ratio and the routine proceeds to step S303. Therefore, the rich side dead time Tr cumulatively added at step S302 corresponds to the time from when the target air-fuel ratio TAF is switched to the lean set air-fuel ratio TAFlean to when the downstream side output air-fuel ratio AFdwn starts to change toward the stoichiometric air-fuel ratio. Note that, the initial value of the rich side dead time Tr is set to zero.

At step S303, it is judged if the rich side dead time Tr is the rich side threshold value time Trthr or more. The rich side threshold value time Trthr is a predetermined time and corresponds to the minimum time of the time where it is judged that the dead time at the downstream side air-fuel ratio sensor 41 is abnormal. If, at step S303, the rich side dead time Tr is the rich side threshold value time Trthr or more, the routine proceeds to step S304. At step S304, it is determined that the dead time at the downstream side air-fuel ratio sensor 41 is abnormal, so the rich side abnormality judgment flag Frf is set to "1". Note that, at step S304, a warning light may be turned on so as to inform a user of the occurrence of an abnormality. On the other hand, if, at step S303, the rich side dead time Tr is less than the rich side threshold value time Trthr, the routine proceeds to step S305. At step S305, it is determined that the dead time at the downstream side air-fuel ratio sensor 41 is not abnormal, that is, that the dead time at the downstream side air-fuel ratio sensor 41 is normal, so the rich side abnormality judgment flag Frf is set to zero.

After abnormality judgment at step S304 or step S305, the routine proceeds to step S306. At step S306, the rich side dead time Tr is reset and made zero. After step S306, the control routine is ended.

<Control Routine of Lean Side Abnormality Diagnosis>

Figure 10:
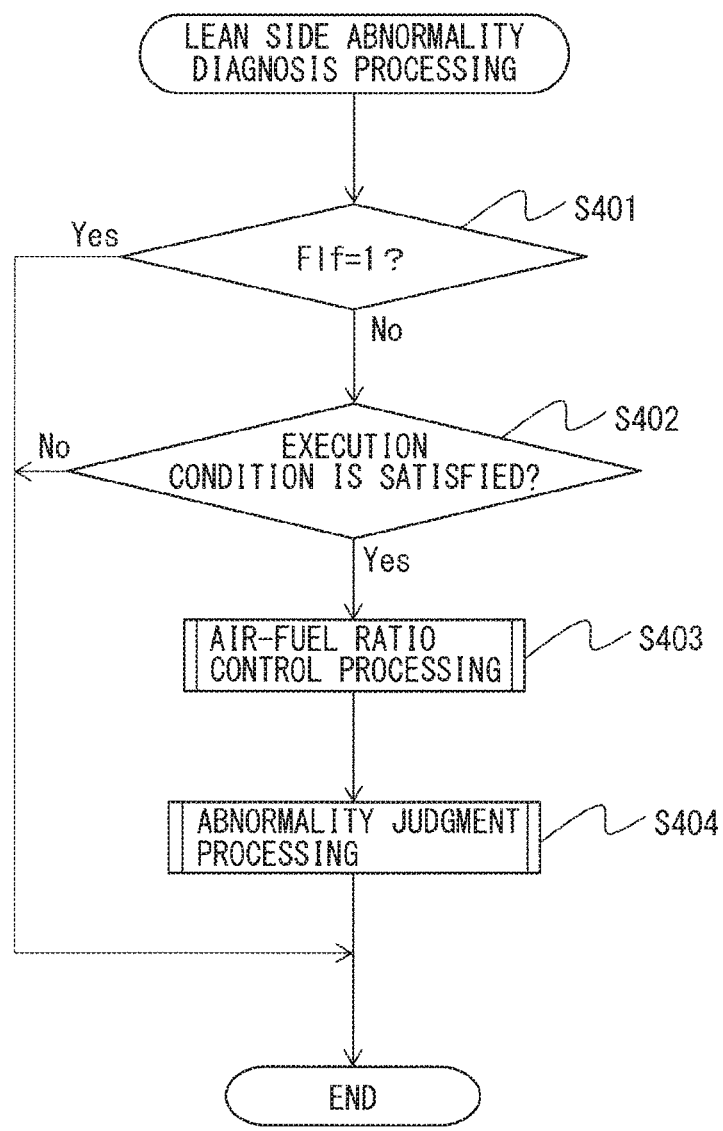
FIG. 10 is a flow chart showing a control routine of lean side abnormality diagnosis processing of a downstream side air-fuel ratio sensor.

Below, referring to the flow chart of FIG. 10, lean side abnormality diagnosis of the downstream side air-fuel ratio sensor 41 will be explained in detail. FIG. 10 is a flow chart showing a control routine of lean side abnormality diagnosis processing of the downstream side air-fuel ratio sensor 41. In the illustrated control routine, abnormality of the dead time when the output air-fuel ratio AFdwn of the downstream side air-fuel ratio sensor 41 changes from a side leaner than the stoichiometric air-fuel ratio to the stoichiometric air-fuel ratio is diagnosed.

The illustrated control routine is, for example, performed each time the internal combustion engine is started at a predetermined timing after startup of the internal combustion engine. Note that, the illustrated control routine may be performed continuously after the end of the rich side abnormality diagnosis processing shown in FIG. 7. First, at step S401, it is judged if the lean side abnormality judgment flag Flf is "1". The lean side abnormality judgment flag Flf is a flag made "1" when it is judged that the lean side dead time at the downstream side air-fuel ratio sensor 41 is abnormal in the later explained abnormality judgment processing. Note that, the initial value of the lean side abnormality judgment flag Flf is set to zero. If, at step S401, it is judged that the lean side abnormality judgment flag Flf is "1", there is no need to perform the abnormality diagnosis, so the control routine is ended. On the other hand, if, at step S401, it is judged that the lean side abnormality judgment flag Flf is zero, the routine proceeds to step S402.

Step S402 at FIG. 10 is similar to step S102 at FIG. 7, so the explanation will be omitted. At step S403, the later explained air-fuel ratio control processing is performed. Next, at step S404, the later mentioned abnormality judgment processing is performed. After step S404, the control routine is ended.

<Control Routine of Air-Fuel Ratio Control Processing>

Figure 11:
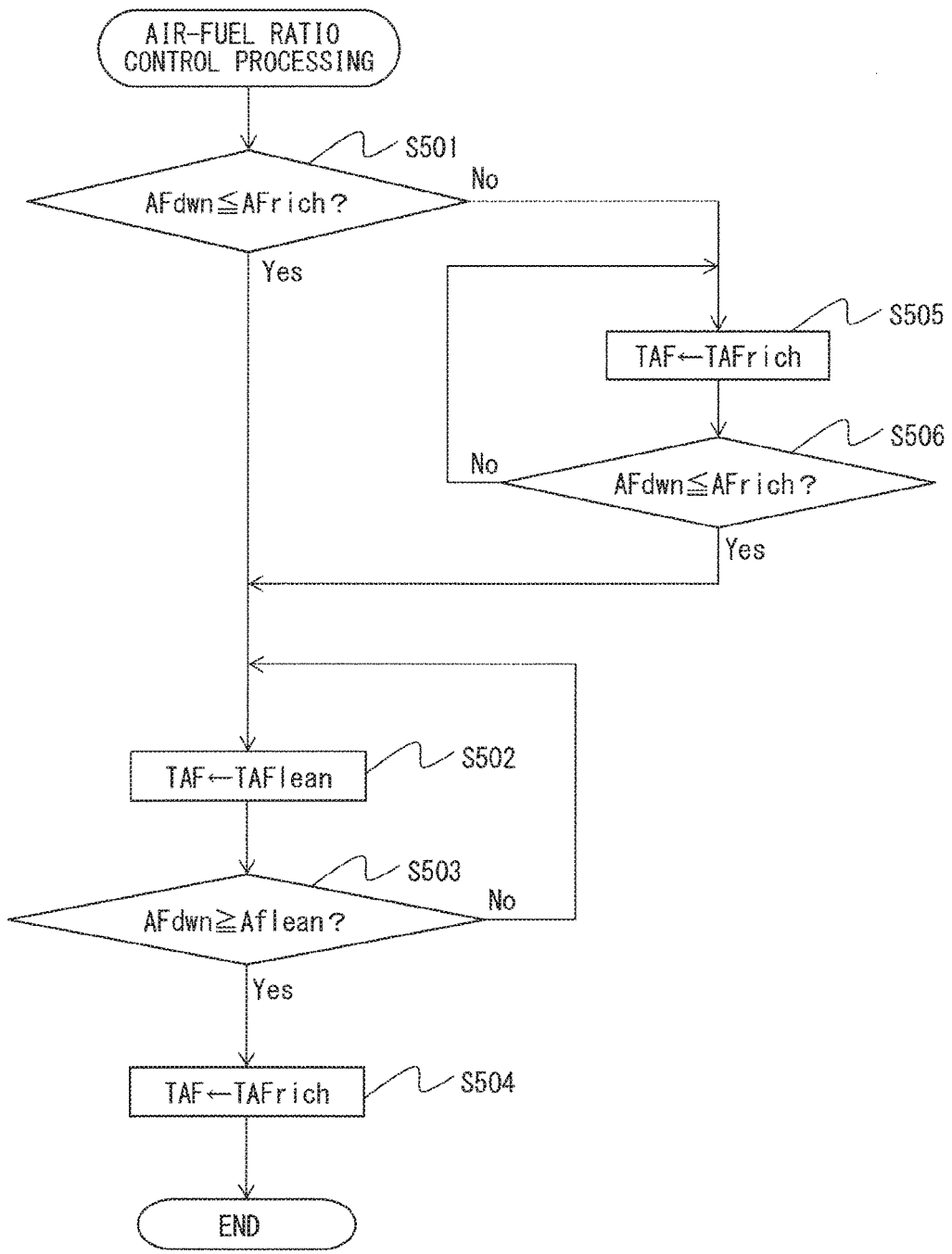
FIG. 11 is a flow chart showing a control routine of air-fuel ratio control processing.

In the air-fuel ratio control processing at step S403 of FIG. 10, first, the target air-fuel ratio TAF is set to the lean set air-fuel ratio TAFlean or rich set air-fuel ratio TAFrich based on the current downstream side output air-fuel ratio AFdwn. After that, to calculate the lean side dead time Tl, the target air-fuel ratio TAF is switched between the lean set air-fuel ratio TAFlean and the rich set air-fuel ratio TAFrich. Below, referring to the flow chart of FIG. 11, this air-fuel ratio control processing will be explained in detail. FIG. 11 is a flow chart showing the control routine of air-fuel ratio control processing.

First, at step S501, it is judged if the downstream side output air-fuel ratio AFdwn is the rich judged air-fuel ratio AFrich or less. If the downstream side output air-fuel ratio AFdwn is the rich judged air-fuel ratio AFrich or less, the routine proceeds to step S502.

At step S502, the target air-fuel ratio TAF is set to the lean set air-fuel ratio TAFlean. Next, at step S503, it is judged if the downstream side output air-fuel ratio AFdwn is the lean judged air-fuel ratio AFlean or more. If it is judged that the downstream side output air-fuel ratio AFdwn is smaller than the lean judged air-fuel ratio AFlean, the routine returns to step S502. On the other hand, if it is judged that the downstream side output air-fuel ratio AFdwn is the lean judged air-fuel ratio AFlean or more, the routine proceeds to step S504. Therefore, the target air-fuel ratio TAF is maintained at the lean set air-fuel ratio TAFlean until the downstream side output air-fuel ratio AFdwn becomes the lean judged air-fuel ratio AFlean or more.

At step S504, the target air-fuel ratio TAF is switched from the lean set air-fuel ratio TAFlean to the rich set air-fuel ratio TAFrich. After step S504, the control routine is ended.

On the other hand, if, at step S501, it is judged that the downstream side output air-fuel ratio AFdwn is larger than the rich judged air-fuel ratio AFrich, the routine proceeds to step S505. At step S505, the target air-fuel ratio TAF is set to the rich set air-fuel ratio TAFrich.

Next, at step S506, it is judged if the downstream side output air-fuel ratio AFdwn is the rich judged air-fuel ratio AFrich or less. If it is judged that the downstream side output air-fuel ratio AFdwn is larger than the rich judged air-fuel ratio AFrich, the routine returns to step S505. On the other hand, if it is judged that the downstream side output air-fuel ratio AFdwn is the rich judged air-fuel ratio AFrich or less, the routine proceeds to step S502. Therefore, the target air-fuel ratio TAF is maintained at the rich set air-fuel ratio TAFrich until the downstream side output air-fuel ratio AFdwn becomes the rich judged air-fuel ratio AFrich or less.

At step S502, the target air-fuel ratio TAF is switched from the rich set air-fuel ratio TAFrich to the lean set air-fuel ratio TAFlean. After step S502, the above-mentioned step S503 and step S504 are performed.

<Control Routine of Abnormality Judgment Processing>

Figure 12:
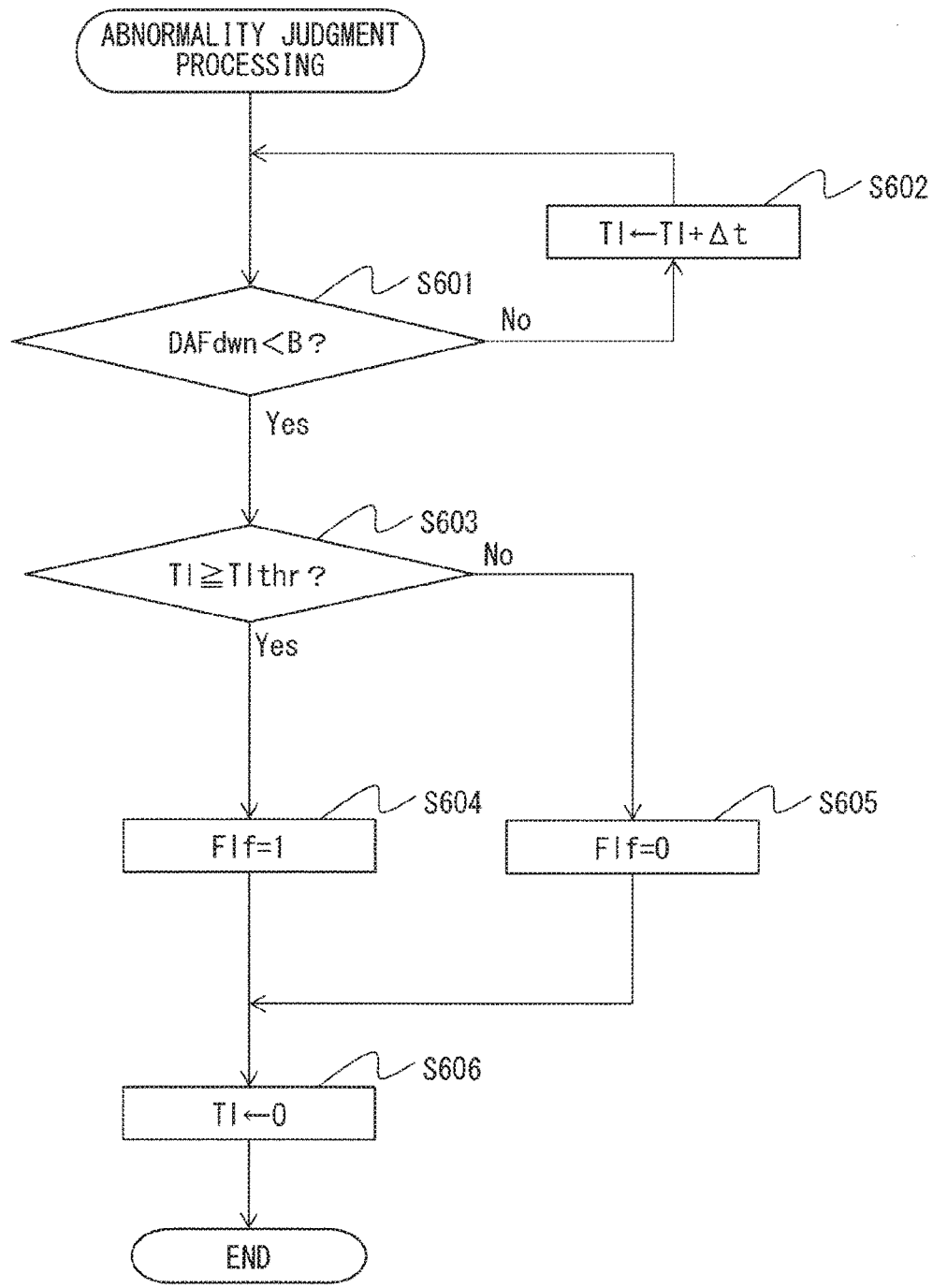
FIG. 12 is a flow chart showing a control routine of abnormality judgment processing.

In the abnormality judgment processing at step S404 of FIG. 10, the lean side dead time Tl is calculated and it is judged if the dead time at the downstream side air-fuel ratio sensor 41 is abnormal. Below, referring to the flow chart of FIG. 12, this abnormality judgment processing will be explained in detail. FIG. 12 is a flow chart showing the control routine of abnormality judgment processing.

First, at step S601, it is judged that the differential value DAFdwn of the downstream side output air-fuel ratio AFdwn is smaller than the predetermined value B. The predetermined value B is zero or a value slightly smaller than zero. This judgment is performed for judging if the downstream side output air-fuel ratio AFdwn has started to change toward the stoichiometric air-fuel ratio. If it is judged that the differential value DAFdwn of the downstream side output air-fuel ratio AFdwn is the predetermined value B or more, it is judged that the downstream side output air-fuel ratio AFdwn has not started to change toward the stoichiometric air-fuel ratio, then the routine proceeds to step S602.

At step S602, the lean side dead time Tl plus the fine time Δt is made the new lean side dead time Tl. At step S601, if it is judged that the differential value DAFdwn of the downstream side output air-fuel ratio AFdwn is smaller than the predetermined value B, it is judged that the downstream side output air-fuel ratio AFdwn has started to change toward the stoichiometric air-fuel ratio and the routine proceeds to step S603. Therefore, the lean side dead time Tl cumulatively added at step S602 corresponds to the time from when the target air-fuel ratio TAF is switched to the rich set air-fuel ratio TAFrich to when the downstream side output air-fuel ratio AFdwn starts to change toward the stoichiometric air-fuel ratio. Note that, the initial value of the lean side dead time Tl is set to zero.

At step S603, it is judged if the lean side dead time Tl is the lean side threshold value time Tlthr or more. The lean side threshold value time Tlthr is a predetermined time and corresponds to the minimum value of the time when it is judged that the dead time at the downstream side air-fuel ratio sensor 41 is abnormal. At step S603, if it is judged that the lean side dead time Tl is the lean side threshold value time Tlthr or more, the routine proceeds to step S604. At step S604, it is determined that the dead time at the downstream side air-fuel ratio sensor 41 is abnormal, so the lean side abnormality judgment flag Flf is set to "1". Note that, at step S604, a warning light may be turned on to inform the user of the occurrence of an abnormality. On the other hand, if, at step S603, it is judged that the lean side dead time Tl is less than the lean side threshold value time Tlthr, the routine proceeds to step S605. At step S605, it is determined that the dead time at the downstream side air-fuel ratio sensor 41 is not abnormal, that is, that the dead time at the downstream side air-fuel ratio sensor 41 is normal, so the lean side abnormality judgment flag Flf is set to zero.

After the abnormality judgment at step S604 or step S605, the routine proceeds to step S606. At step S606, the lean side dead time Tl is reset and made zero. After step S606, the present control routine is ended.

Second Embodiment

Next, a second embodiment of the present disclosure will be explained. Note that, the configuration and control of the internal combustion engine of the second embodiment are basically the same as the internal combustion engine of the first embodiment, so in the following explanation, the parts different from the first embodiment will basically be explained. In the second embodiment, after the end of fuel cut control, abnormality of the dead time is diagnosed when the downstream side output air-fuel ratio AFdwn changes from the lean side from the stoichiometric air-fuel ratio to the stoichiometric air-fuel ratio. Below, the fuel cut control in the present embodiment will be explained.

<Fuel Cut Control>

In the internal combustion engine of the present embodiment, at the time of deceleration of the vehicle mounting the internal combustion engine etc., fuel injection from the fuel injector 11 is stopped to stop the feed of fuel to the combustion chamber 5 during operation of the internal combustion engine as fuel cut control. This fuel cut control is started when a predetermined fuel cut start condition is satisfied. For example, fuel cut control is performed when the amount of depression of the accelerator pedal 42 is zero or substantially zero (that is, the engine load is zero or substantially zero) and the engine speed is a predetermined speed higher than the speed at the time of idling or is more.

When fuel cut control is performed, air or exhaust gas similar to air is exhausted from the internal combustion engine, so gas of an extremely high air-fuel ratio (that is, extremely high lean degree) flows into the exhaust purification catalyst 20. As a result, during fuel cut control, a large amount of oxygen flows into the exhaust purification catalyst 20 and the oxygen storage amount of the exhaust purification catalyst 20 reaches the maximum oxygen storage amount.

Further, fuel cut control is made to end when the predetermined fuel cut end condition is satisfied. As the fuel cut end condition, for example, the amount of depression of the accelerator pedal 42 becoming a predetermined value or more (that is, the engine load becoming a certain extent of value), the engine speed becoming a predetermined speed higher than the speed at the time of idling or becoming less, etc. may be mentioned. Further, in the internal combustion engine of the present embodiment, right after the end of the fuel cut control, the air-fuel ratio of the exhaust gas flowing into the exhaust purification catalyst 20 is made a strong rich set air-fuel ratio richer than the rich set air-fuel ratio as post-reset rich control. Due to this, it is possible to quickly release the oxygen stored in the exhaust purification catalyst 20 during fuel cut control.

Below, referring to the time chart of FIG. 13 and the flow chart of FIG. 14, the abnormality diagnosis in the second embodiment will be specifically explained.

<Time Chart of Lean Side Abnormality Diagnosis>

Figure 13:
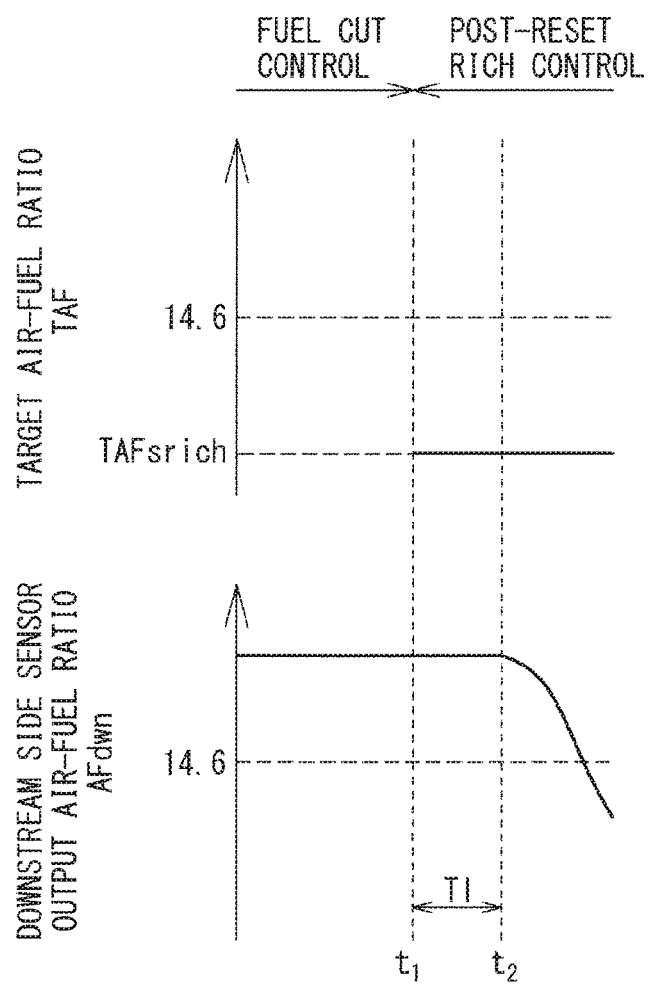
FIG. 13 is a time chart of a target air-fuel ratio and output air-fuel ratio of a downstream side air-fuel ratio sensor in fuel cut control and post-reset rich control.

FIG. 13 is a time chart of the target air-fuel ratio TAF and the output air-fuel ratio AFdwn of the downstream side air-fuel ratio sensor 41 in fuel cut control and post-reset rich control.

In the illustrated example, fuel cut control is performed before the time $t_1$. Due to the fuel cut control, the oxygen storage amount of the exhaust purification catalyst 20 becomes the maximum and the exhaust gas flowing out from the exhaust purification catalyst 20 becomes substantially air. For this reason, before the time $t_1$, the downstream side output air-fuel ratio AFdwn exhibits an extremely large value. FIG. 13 does not show the value of the target air-fuel ratio TAF during fuel cut control, but during fuel cut control, feed of fuel is stopped, so it can be said that the target air-fuel ratio TAF is set to an air-fuel ratio leaner than the stoichiometric air-fuel ratio.

At the time $t_1$, if the fuel cut control is ended, post-reset rich control is performed so as to release the large amount of oxygen stored in the exhaust purification catalyst 20 during fuel cut control. In the post-reset rich control, the target air-fuel ratio TAF is made a strong rich set air-fuel ratio TAFsrich richer than the rich set air-fuel ratio TAFrich. The strong rich set air-fuel ratio TAFsrich is made a predetermined air-fuel ratio, for example, is made 13.5. After that, if an exhaust gas richer than the stoichiometric air-fuel ratio flows into the exhaust purification catalyst 20, the oxygen stored in the exhaust purification catalyst 20 is released, so the amount of oxygen flowing out from the exhaust purification catalyst 20 decreases. As a result, at the time $t_2$, the downstream side output air-fuel ratio AFdwn starts to change toward the stoichiometric air-fuel ratio.

In the present embodiment, the time when the downstream side output air-fuel ratio AFdwn starts to change toward the stoichiometric air-fuel ratio (the time $t_2$ at FIG. 13) is specified based on the differential value of the downstream side output air-fuel ratio AFdwn. Specifically, the time when the differential value of the downstream side output air-fuel ratio AFdwn becomes smaller than a predetermined value is made the time when the downstream side output air-fuel ratio AFdwn starts to change toward the stoichiometric air-fuel ratio.

The predetermined value is made a value enabling the time when the downstream side output air-fuel ratio AFdwn starts to change toward the stoichiometric air-fuel ratio to be identified differentiated from noise of the output signal and is made zero or a value slightly smaller than zero. In the example of FIG. 13, the predetermined value is made zero. Further, if the differential value of the downstream side output air-fuel ratio AFdwn is detected at predetermined time intervals, the time when the differential value of the downstream side output air-fuel ratio AFdwn becomes smaller than the predetermined value a plurality of times in succession may be made the time when the downstream side output air-fuel ratio AFdwn starts to change toward the stoichiometric air-fuel ratio.

In the present embodiment, the time from when the target air-fuel ratio TAF is set to a strong rich set air-fuel ratio TAFsrich to when the downstream side output air-fuel ratio AFdwn starts to change toward the stoichiometric air-fuel ratio is calculated as the lean side dead time Tl. When the lean side dead time Tl is the predetermined lean side threshold value time Tlthr or more, it is judged that the dead time at the downstream side air-fuel ratio sensor 41 is abnormal.

<Control Routine of Lean Side Abnormality Diagnosis>

Figure 14:
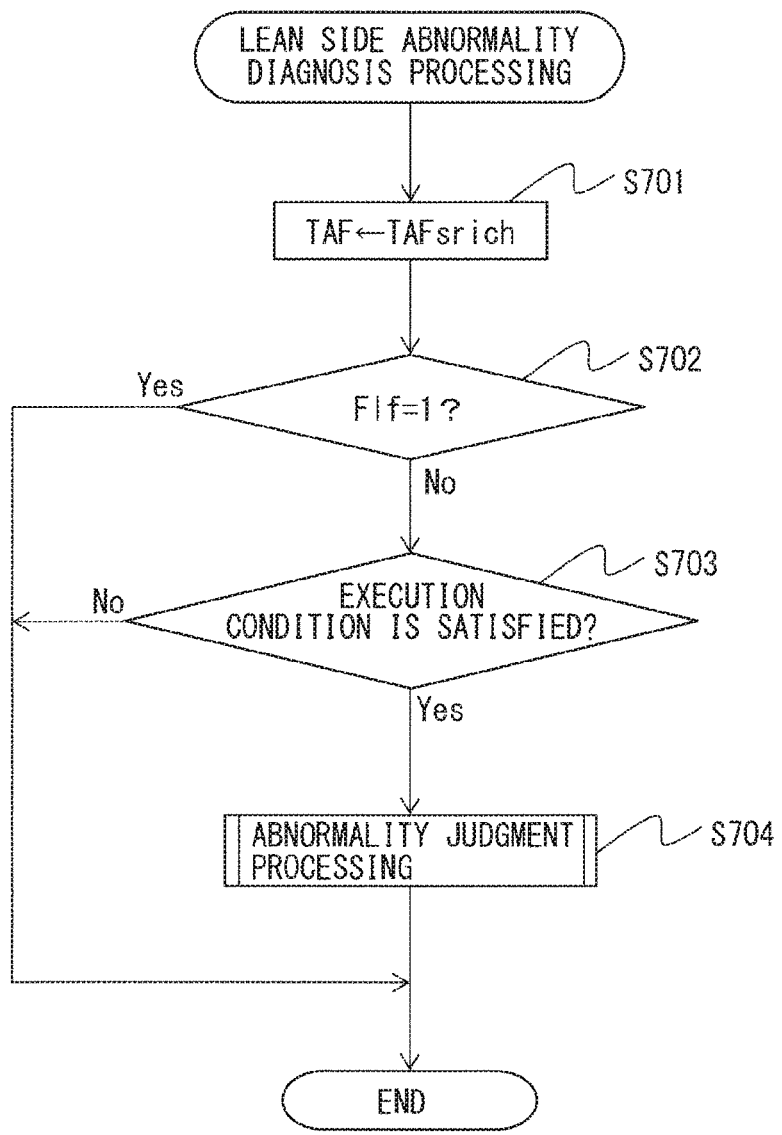
FIG. 14 is a flow chart showing a control routine of lean side abnormality diagnosis processing of a downstream side air-fuel ratio sensor.

FIG. 14 is a flow chart showing a control routine of lean side abnormality diagnosis processing of the downstream side air-fuel ratio sensor 41. In the illustrated control routine, after fuel cut control is ended, abnormality of the dead time when the output air-fuel ratio AFdwn of the downstream side air-fuel ratio sensor 41 changes from a side leaner than the stoichiometric air-fuel ratio to the stoichiometric air-fuel ratio is diagnosed. The illustrated control routine is performed if a predetermined condition for ending fuel cut is satisfied.

First, at step S701, the target air-fuel ratio TAF is set to a strong rich set air-fuel ratio TAFsrich. Next, at step S702, it is judged if the lean side abnormality judgment flag Flf is "1". If it is judged that the lean side abnormality judgment flag Flf is "1", this control routine is ended. On the other hand, if it is judged that the lean side abnormality judgment flag Flf is zero, the routine proceeds to step S703. At step S703, it is judged if the condition for performing abnormality diagnosis processing is satisfied. If it is judged that the condition for performing abnormality diagnosis processing is not satisfied, this control routine is ended. On the other hand, if it is judged that the condition for performing abnormality diagnosis processing is satisfied, the routine proceeds to step S704. At step S704, the abnormality judgment processing shown in FIG. 12 is performed. After step S704, the control routine is ended. Note that, step S702, step S703, and step S704 are similar to step S401, step S402, and step S404 in FIG. 10, so these will not be explained in detail here.

Third Embodiment

Next, a third embodiment of the present disclosure will be explained. Note that, the configuration and control of the internal combustion engine of the third embodiment are basically the same as the internal combustion engines of the first embodiment and second embodiment, so in the following explanation, the parts different from the first embodiment and second embodiment will basically be explained.

Figure 15:
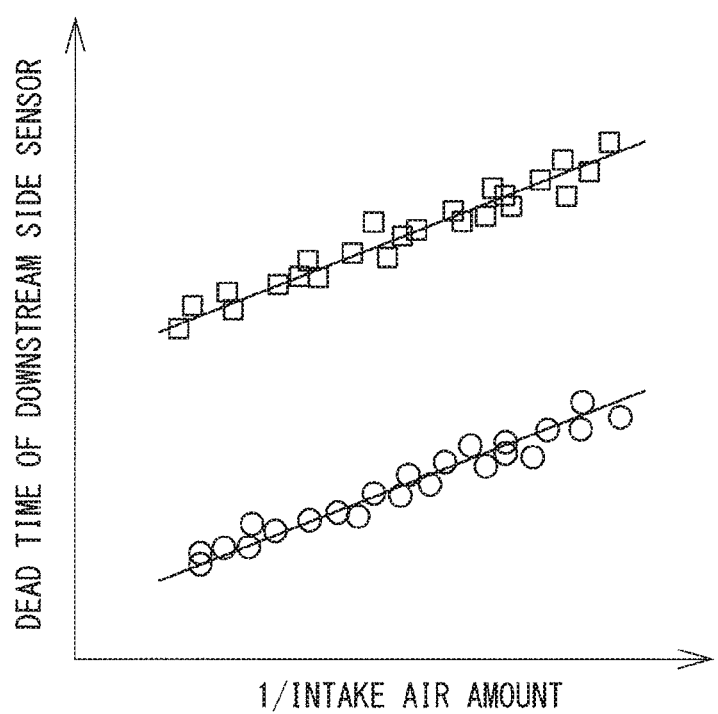
FIG. 15 is a graph showing a relationship of a dead time of a downstream side air-fuel ratio sensor and a reciprocal of an intake air amount.

FIG. 15 is a graph showing the relationship between the dead time of the downstream side air-fuel ratio sensor 41 and the reciprocal of the intake air amount. The intake air amount is, for example, calculated as the average value of the values detected by the air flowmeter 39 during calculation of the dead time. In FIG. 15, values in the case where the dead time in the downstream side air-fuel ratio sensor 41 is not abnormal are plotted as circles, while the values in the case where the dead time in the downstream side air-fuel ratio sensor 41 is abnormal are plotted as squares.

As shown in FIG. 15, the dead time of the downstream side air-fuel ratio sensor 41 is correlated with the reciprocal of the intake air amount. Specifically, the dead time of the downstream side air-fuel ratio sensor 41 becomes longer the larger the reciprocal of the intake air amount. Therefore, in the third embodiment, the dead time calculated in the first embodiment or second embodiment is corrected based on the intake air amount detected by the air flowmeter 39 from when the target air-fuel ratio is switched to when the output air-fuel ratio of the downstream side air-fuel ratio sensor 41 starts to change toward the stoichiometric air-fuel ratio. Specifically, the dead time is corrected so as to become shorter the larger the reciprocal of the intake air amount. In other words, the dead time is corrected so as to become shorter the smaller the intake air amount. If the corrected dead time is a predetermined predetermined time or more, it is judged that the dead time of the downstream side air-fuel ratio sensor 41 is abnormal. As a result, in the third embodiment, it is possible to reduce the fluctuation of the calculated dead time due to the intake air amount, so the abnormality of the dead time of the downstream side air-fuel ratio sensor 41 can be diagnosed more precisely.

Below, referring to the flow charts of FIG. 16 and FIG. 17, abnormality diagnosis in a third embodiment will be specifically explained.

Figure 16:
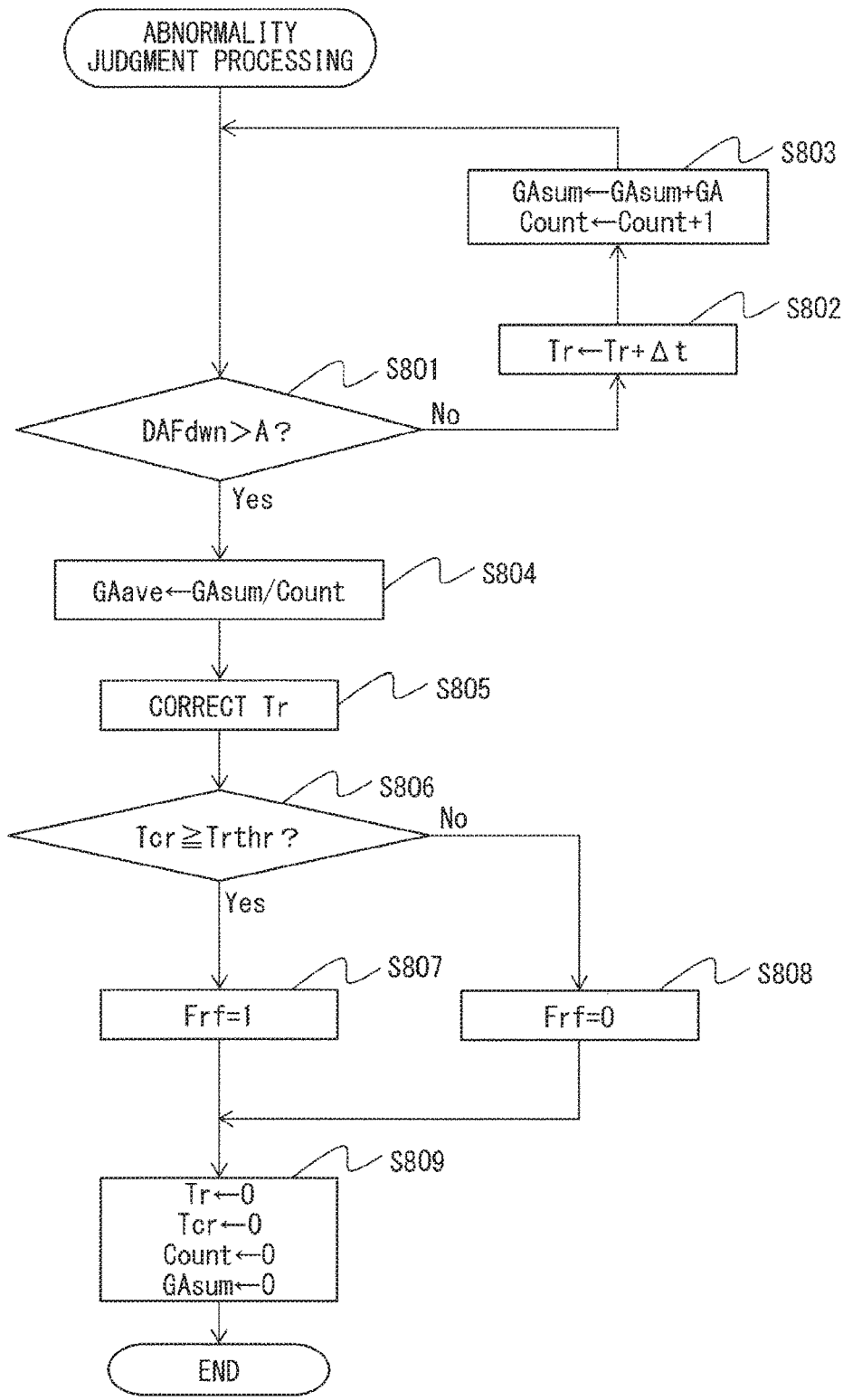
FIG. 16 is a flow chart showing a control routine of abnormality judgment processing.

In the third embodiment, the rich side abnormality diagnosis processing shown in FIG. 7 is performed, but at step S104 in FIG. 7, the abnormality judgment processing shown in FIG. 16 is performed. FIG. 16 is a flow chart showing the control routine of abnormality judgment processing.

Step S801 and step S802 of FIG. 16 are similar to step S301 and step S302 in FIG. 9, so the explanation will be omitted. After step S802, the routine proceeds to step S803.

At step S803, the previously calculated total intake air amount GAsum plus the newly detected intake air amount GA is made the new intake air amount GAsum. The intake air amount GA is detected by the air flowmeter 39. Note that, the initial value of the total intake air amount GAsum is set to zero. Further, at step S803, the previously calculated times of detection COUNT plus "1" is made the new times of detection COUNT. Note that, the initial value of the times of detection COUNT is set to zero. After step S803, the routine proceeds to step S801.

At step S801, if it is judged that the differential value DAFdwn of the downstream side output air-fuel ratio AFdwn is larger than the predetermined value A, the routine proceeds to step S804. At step S804, the average intake air amount GAave is calculated. Specifically, the total intake air amount GAsum calculated at step S803 is divided by the times of detection COUNT calculated at step S803 and the value is made the average intake air amount GAave. Therefore, the average intake air amount GAave corresponds to the average value of the amount of intake air fed to the combustion chamber 5 during calculation of the dead time.

Next, at step S805, the rich side dead time Tr calculated at step S802 is corrected. The corrected rich side dead time Tcr is for example calculated by the following formula.

$$Tcr=(GAref-1/GAave)Xa+Tr$$

Here, GAref indicates a reference intake air amount, while "a" indicates a correction coefficient. The reference intake air amount GAref is a value determined in advance and corresponding to the reciprocal of a predetermined intake air amount. Further, the correction coefficient "a" is a value calculated by experiments or calculation and corresponds to the slope of the two groups of data shown in FIG. 15. Therefore, (GAref–1/GAave)×a corresponds to the amount of correction of the rich side dead time Tr and becomes linearly smaller the larger the reciprocal of the average intake air amount GAave. Note that, the amount of correction of the rich side dead time Tr may be set so as to be smaller in steps as the reciprocal of the intake air amount becomes larger, that is, as the intake air amount becomes smaller, without using the above formula.

Next, at step S806, it is judged if the corrected rich side dead time Tcr is the rich side threshold value time Trthr or more. If, at step S806, it is judged that the corrected rich side dead time Tcr is the rich side threshold value time Trthr or more, the routine proceeds to step S807. At step S807, it is determined that the dead time at the downstream side air-fuel ratio sensor 41 is abnormal, so the rich side abnormality judgment flag Frf is set to "1". On the other hand, if, at step S806, it is judged if the corrected rich side dead time Tcr is less than the rich side threshold value time Trthr, the routine proceeds to step S808. At step S808, it is determined that the dead time at the downstream side air-fuel ratio sensor 41 is not abnormal, that is, that the dead time at the downstream side air-fuel ratio sensor 41 is normal, so the rich side abnormality judgment flag Frf is set to zero.

After abnormality is judged at step S807 or step S808, the routine proceeds to step S809. At step S809, the rich side dead time Tr, the corrected rich side dead time Tcr, the times of detection COUNT, and the total intake air amount GAsum are reset and made zero. After step S809, the present control routine is ended.

Further, in the third embodiment, the lean side abnormality diagnosis processing shown in FIG. 10 is performed, but at step S404 at FIG. 10, the abnormality judgment processing shown in FIG. 17 is performed. In the same way, in the third embodiment, the lean side abnormality diagnosis processing shown in FIG. 14 is performed, but at step S704 in FIG. 14, the abnormality judgment processing shown in FIG. 17 is performed.

FIG. 17 is a flow chart showing the control routine of abnormality judgment processing. Step S901, step S902, and step S907 and step S908 in FIG. 17 are similar to step S601, step S602, and step S604 and step S605 in FIG. 12, so explanations will be omitted. Further, step S903 to step S906 and step S909 in FIG. 17 are similar to step S803 to step S806 and step S809 in FIG. 16, so the explanations will be omitted.

Note that, in the third embodiment, instead of correcting the dead time, the rich side threshold value time Trthr and lean side threshold value time Tlthr may be calculated based on the intake air amount detected by the air flowmeter 39 in the time from when the target air-fuel ratio is switched to when the output air-fuel ratio of the downstream side air-fuel ratio sensor 41 starts to change toward the stoichiometric air-fuel ratio. Specifically, the rich side threshold value time Trthr and lean side threshold value time Tlthr are calculated to become longer the larger the reciprocal of the intake air amount. In other words, the rich side threshold value time Trthr and lean side threshold value time Tlthr are calculated so as to become longer the smaller the intake air amount.

In this case, at step S805 in FIG. 16, instead of correcting the rich side dead time Tr, the rich side threshold value time Trthr is calculated. The rich side threshold value time Trthr is for example calculated by the following formula:

$$Trthr=(1/GAave-GAref)\times a+Trrthr$$

Here, Trrthr indicates a reference rich side threshold value time. The reference rich side threshold value time Trrthr is determined in advance and is calculated based on the reference intake air amount GAref by experiments or calculations. Therefore, the rich side threshold value time Trthr is made linearly longer the larger the reciprocal of the average intake air amount GAave. Note that, the rich side threshold value time Trthr may be set, without using the above formula, to become longer in steps the larger the reciprocal of the intake air amount, that is, the smaller the intake air amount.

Further, the rich side threshold value time Trthr may be calculated based on a map shown as a function of the reciprocal of the average intake air amount GAave. Specifically, in the above map, the rich side threshold value time Trrthr is shown as becoming longer the larger the reciprocal of the average intake air amount GAave.

After the above step S805, at step S806, it s judged if the rich side dead time Tr calculated at step S802 is the rich side threshold value time Trthr calculated at step S805 or more. Note that, step S905 and step S906 in FIG. 17 can be changed in the same way as step S805 and step S806 in FIG. 16.

Note that, all of the above control operations are controlled by the ECU 31 of the internal combustion engine.

Above, embodiments according to the present disclosure were explained but the present disclosure is not limited to these embodiments and can be modified and changed in various ways within the language of the claims. For example, abnormality diagnosis may be performed if fuel cut control is started when the output air-fuel ratio of the downstream side air-fuel ratio sensor 41 is richer than the stoichiometric air-fuel ratio. In this case, the time from when feed of fuel to the combustion chamber 5 is stopped due to the fuel cut control to when the output air-fuel ratio of the downstream side air-fuel ratio sensor 41 starts to change toward the stoichiometric air-fuel ratio is calculated based on the differential value of the output air-fuel ratio of the downstream side air-fuel ratio sensor 41.

REFERENCE SIGNS LIST 1. engine body
5. combustion chamber
6. intake valve
7. intake port
8. exhaust valve
9. exhaust port
11. fuel injector
19. exhaust manifold
20. exhaust purification catalyst
31. ECU
39. air flowmeter
40. upstream side air-fuel ratio sensor
41. downstream side air-fuel ratio sensor

The invention claimed is:

1. An abnormality diagnosis system of a downstream side air-fuel ratio sensor provided in an exhaust passage of an internal combustion engine at a downstream side of an exhaust purification catalyst in a direction of exhaust flow, comprising
    an air flowmeter detecting an amount of intake air fed to a combustion chamber; and
    an electronic control unit configured to:
    set a target air-fuel ratio of exhaust gas flowing into the exhaust purification catalyst and control an amount of fuel fed to the combustion chamber so that an air-fuel ratio of the exhaust gas flowing into the exhaust purification catalyst matches the target air-fuel ratio, the electronic control unit sets the target air-fuel ratio to a first set air-fuel ratio set to a first side of either side of a rich side and lean side from a stoichiometric air-fuel ratio, then, when a downstream side output air-fuel ratio detected by the downstream side air-fuel ratio sensor is at the first side from the stoichiometric air-fuel ratio, switches the target air-fuel ratio from the first set air-fuel ratio to a second set air-fuel ratio set to a second side at the opposite side from the first side from the stoichiometric air-fuel ratio;
    calculate a time from when the target air-fuel ratio is switched from the first set air-fuel ratio to the second set air-fuel ratio to when the downstream side output air-fuel ratio starts to change toward the stoichiometric air-fuel ratio based on a differential value of the downstream side output air-fuel ratio;
    correct the calculated time based on an intake air amount detected by the air flowmeter from when the target air-fuel ratio is switched from the first set air-fuel ratio to the second set air-fuel ratio to when the downstream side output air-fuel ratio starts to change toward the stoichiometric air-fuel ratio; and
    judge that a dead time at the downstream side air-fuel ratio sensor is abnormal when the corrected time is a predetermined time or more, and judge that the dead time at the downstream side air-fuel ratio sensor is not abnormal when the corrected time is less than the predetermined time.

2. The abnormality diagnosis system of a downstream side air-fuel ratio sensor according to claim 1, wherein the first side is a side richer than the stoichiometric air-fuel ratio, the second side is a side leaner than the stoichiometric air-fuel ratio, and the electronic control unit is configured to judge that the downstream side output air-fuel ratio has started to change toward the stoichiometric air-fuel ratio when the differential value of the downstream side output air-fuel ratio becomes larger than a predetermined value after the target air-fuel ratio is switched from the first set air-fuel ratio to the second set air-fuel ratio.

3. The abnormality diagnosis system of a downstream side air-fuel ratio sensor according to claim 1, wherein the first side is a side leaner than the stoichiometric air-fuel ratio, the second side is a side richer than the stoichiometric air-fuel ratio, and the electronic control unit is configured to judge that the downstream side output air-fuel ratio has started to change toward the stoichiometric air-fuel ratio when the differential value of the downstream side output air-fuel ratio becomes smaller than a predetermined value after the target air-fuel ratio is switched from the first set air-fuel ratio to the second set air-fuel ratio.

4. The abnormality diagnosis system of a downstream side air-fuel ratio sensor according to claim 1, wherein
    the abnormality diagnosis system further comprises an upstream side air-fuel ratio sensor provided in the exhaust passage at an upstream side of the exhaust purification catalyst in the direction of exhaust flow, and
    the electronic control unit is configured to perform feedback control of the amount of fuel fed to the combustion chamber so that an upstream side output air-fuel ratio detected by the upstream side air-fuel ratio sensor matches the target air-fuel ratio.

5. The abnormality diagnosis system of a downstream side air-fuel ratio sensor according to claim 1, wherein
    the predetermined time is calculated based on an intake air amount detected by the air flowmeter from when the target air-fuel ratio is switched from the first set air-fuel ratio to the second set air-fuel ratio to when the downstream side output air-fuel ratio starts to change toward the stoichiometric air-fuel ratio.

6. An abnormality diagnosis system of a downstream side air-fuel ratio sensor provided in an exhaust passage of an internal combustion engine at a downstream side of an exhaust purification catalyst in a direction of exhaust flow, comprising
    an air flowmeter detecting an amount of intake air fed to a combustion chamber; and
    an electronic control unit configured to:
    set a target air-fuel ratio of exhaust gas flowing into the exhaust purification catalyst and control an amount of fuel fed to the combustion chamber so that an air-fuel ratio of the exhaust gas flowing into the exhaust purification catalyst matches the target air-fuel ratio,
    the electronic control unit sets the target air-fuel ratio to a first set air-fuel ratio set to a first side of either side of a rich side and lean side from a stoichiometric air-fuel ratio, then, when a downstream side output air-fuel ratio detected by the downstream side air-fuel ratio sensor is at the first side from the stoichiometric air-fuel ratio, switches the target air-fuel ratio from the first set air-fuel ratio to a second set air-fuel ratio set to a second side at the opposite side from the first side from the stoichiometric air-fuel ratio;
    calculate a time from when the target air-fuel ratio is switched from the first set air-fuel ratio to the second set air-fuel ratio to when the downstream side output air-fuel ratio starts to change toward the stoichiometric air-fuel ratio based on a differential value of the downstream side output air-fuel ratio and, when the calculated time is a predetermined time or more, to judge that a dead time at the downstream side air-fuel ratio sensor is abnormal, and the predetermined time is calculated based on an intake air amount detected by the air flowmeter from when the target air-fuel ratio is switched from the first set air-fuel ratio to the second set air-fuel ratio to when the downstream side output air-fuel ratio starts to change toward the stoichiometric air-fuel ratio.

7. The abnormality diagnosis system of a downstream side air-fuel ratio sensor according to claim 6, wherein the electronic control unit is configured to judge that the dead time in the downstream side air-fuel ratio sensor is not abnormal when the calculated time is less than the predetermined time.

8. The abnormality diagnosis system of a downstream side air-fuel ratio sensor according to claim 7, wherein the first side is a side richer than the stoichiometric air-fuel ratio, the second side is a side leaner than the stoichiometric air-fuel ratio, and the electronic control unit is configured to judge that the downstream side output air-fuel ratio has started to change toward the stoichiometric air-fuel ratio when the differential value of the downstream side output air-fuel ratio becomes larger than a predetermined value after the target air-fuel ratio is switched from the first set air-fuel ratio to the second set air-fuel ratio.

9. The abnormality diagnosis system of a downstream side air-fuel ratio sensor according to claim 7, wherein the first side is a side leaner than the stoichiometric air-fuel ratio, the second side is a side richer than the stoichiometric air-fuel ratio, and the electronic control unit is configured to judge that the downstream side output air-fuel ratio has started to change toward the stoichiometric air-fuel ratio when the differential value of the downstream side output air-fuel ratio becomes smaller than a predetermined value after the target air-fuel ratio is switched from the first set air-fuel ratio to the second set air-fuel ratio.

10. The abnormality diagnosis system of a downstream side air-fuel ratio sensor according to claim 6, wherein the first side is a side richer than the stoichiometric air-fuel ratio, the second side is a side leaner than the stoichiometric air-fuel ratio, and the electronic control unit is configured to judge that the downstream side output air-fuel ratio has started to change toward the stoichiometric air-fuel ratio when the differential value of the downstream side output air-fuel ratio becomes larger than a predetermined value after the target air-fuel ratio is switched from the first set air-fuel ratio to the second set air-fuel ratio.

11. The abnormality diagnosis system of a downstream side air-fuel ratio sensor according to claim 6, wherein the first side is a side leaner than the stoichiometric air-fuel ratio, the second side is a side richer than the stoichiometric air-fuel ratio, and the electronic control unit is configured to judge that the downstream side output air-fuel ratio has started to change toward the stoichiometric air-fuel ratio when the differential value of the downstream side output air-fuel ratio becomes smaller than a predetermined value after the target air-fuel ratio is switched from the first set air-fuel ratio to the second set air-fuel ratio.

12. The abnormality diagnosis system of a downstream side air-fuel ratio sensor according to claim 6, wherein the abnormality diagnosis system further comprises an upstream side air-fuel ratio sensor provided in the exhaust passage at an upstream side of the exhaust purification catalyst in the direction of exhaust flow, and the electronic control unit is configured to perform feedback control of the amount of fuel fed to the combustion chamber so that an upstream side output air-fuel ratio detected by the upstream side air-fuel ratio sensor matches the target air-fuel ratio.

* * * * *

UNITED STATES PATENT AND TRADEMARK OFFICE
CERTIFICATE OF CORRECTION

PATENT NO. : 10,156,200 B2
APPLICATION NO. : 15/222372
DATED : December 18, 2018
INVENTOR(S) : Hiroshi Miyamoto Page 1 of 1

It is certified that error appears in the above-identified patent and that said Letters Patent is hereby corrected as shown below:

In the Specification

In Column 5, Line 38, before "which", delete "runnres" and insert --runners--, therefor.

Signed and Sealed this
Second Day of April, 2019

Andrei Iancu
*Director of the United States Patent and Trademark Office*